US012697619B2

(12) United States Patent
Shavit et al.

(10) Patent No.: US 12,697,619 B2
(45) Date of Patent: Aug. 4, 2026

(54) DEVICES AND METHODS FOR THAWING BIOLOGICAL SUBSTANCES

(71) Applicant: FreMon Scientific, Inc., La Jolla, CA (US)

(72) Inventors: Menachem Shavit, Haworth, NJ (US); Farideh Z. Bischoff, Sugar Land, TX (US)

(73) Assignee: FreMon Scientific, Inc., La Jolla, CA (US)

( * ) Notice: Subject to any disclaimer, the term of this patent is extended or adjusted under 35 U.S.C. 154(b) by 1089 days.

(21) Appl. No.: 17/695,693

(22) Filed: Mar. 15, 2022

(65) Prior Publication Data

US 2022/0297130 A1 Sep. 22, 2022

Related U.S. Application Data

(60) Provisional application No. 63/161,853, filed on Mar. 16, 2021.

(51) Int. Cl.
*B01L 7/00* (2006.01)
*G01N 1/44* (2006.01)

(52) U.S. Cl.
CPC .................. *B01L 7/00* (2013.01); *G01N 1/44* (2013.01); *B01L 2200/025* (2013.01); *B01L 2200/147* (2013.01); *B01L 2300/0609* (2013.01); *B01L 2300/0663* (2013.01)

(58) Field of Classification Search
None
See application file for complete search history.

(56) References Cited

U.S. PATENT DOCUMENTS

| | | | | |
|---|---|---|---|---|
| 2017/0257908 | A1* | 9/2017 | Schryver | A01N 1/162 |
| 2019/0075786 | A1* | 3/2019 | Milne | A61M 1/0272 |
| 2019/0339176 | A1* | 11/2019 | Shavit | A61J 1/18 |
| 2021/0087549 | A1* | 3/2021 | Fan | C40B 70/00 |

* cited by examiner

*Primary Examiner* — Elizabeth M Kerr
(74) *Attorney, Agent, or Firm* — Procopio, Cory, Hargreaves & Savitch LLP

(57) ABSTRACT

Devices, systems, and methods herein relate to controlling a temperature (e.g., thawing) of a low volume biological substance. In some variations, a container enclosure for use with a device configured to control a temperature of a biological substance may comprise an adapter configured to receive a container comprising the biological substance.

7 Claims, 18 Drawing Sheets

Samples 1-5 = Fresh RNA

Samples 6-10 = Room temperature RNA

Samples 11-15 = Container enclosure thawed RNA

Sample 16: No template

Method of thawing a biological
substance 1800

| Positioning a container in an adpater 1802 |
|---|

↓

| Positioning the adapter in a chamber1804 |
|---|

↓

| Activating a heating assembly 1806 |
|---|

DEVICES AND METHODS FOR THAWING BIOLOGICAL SUBSTANCES

CROSS-REFERENCE TO RELATED APPLICATIONS

This application claims priority to U.S. Provisional Patent Application No. 63/161,853 filed Mar. 16, 2021, which is hereby incorporated by reference in its entirety.

TECHNICAL FIELD

Devices and methods herein relate to thawing biological substances.

BACKGROUND

Bags and vials containing biological substances such as, for example, plasma, blood, blood products, medications, and prophylactics may be supplied to medical facilities for transfer to patients on a regular basis. These biological substances may be frozen for storage and later thawed to a designated temperature just prior to use. Other times, these biological substances may need to be cooled or the temperature may need to be maintained at a designated temperature. The quality of the thawed biological substances may depend upon the process by which they are heated or cooled. Underheating or overheating a biological substance may reduce its effectiveness, thereby endangering patients, especially for low volume biological substances. Accordingly, improved devices and methods are needed for controlling the temperature of biological substances.

SUMMARY

Described here are devices and methods for thawing biological substances. These devices and methods may, for example, rapidly thaw a small volume of a biological substance such as a vaccine to a suitable temperature for use. In some variations, a container enclosure for use in thawing a biological substance may comprise a cavity configured to receive a container comprising the biological substance. The container may have a volume of up to about 50 mL. A temperature sensor may be configured to measure a temperature of the biological substance. The temperature sensor may overly a portion of the cavity configured to hold the container during thawing. The container may comprise an identifier for the biological substance.

In some variations, a ratio of a diameter of the container to a width of the cavity may be between about 1:1 and about 5:32. In some variations, the biological substance may comprise one or more of an mRNA vaccine, DNA vaccine, exosome, liquid biopsy, blood, cryo-preserved tissue, therapeutic, prophylactic, and cell therapy product. In some variations, the cell therapy product may comprise one or more of stem cells and T-cells. In some variations, the identifier may receive the temperature measurement from the temperature sensor. In some variations, the cavity may comprise a shape configured to funnel the container to a predetermined position and location within the enclosure.

In some variations, the container enclosure may be configured to receive a container with a temperature of down to about −80° C. In some variations, the container may comprise one or more of a vial and cuvette. In some variations, the enclosure may comprise a thermally conductive material configured to transfer thermal energy to regulate a temperature of the biological substance. In some variations, the enclosure may be configured for single use.

Also described herein is a container enclosure for use in thawing a biological substance comprising an adapter configured to receive a container comprising the biological substance, and a housing comprising a thermal conductor defining a cavity configured to receive the adapter, a temperature sensor configured to measure the temperature of the biological substance, and an identifier for the biological substance.

In some variations, a system comprising the container enclosure may further comprise a temperature control device comprising a chamber and a thermal source. The temperature control device may be configured to receive the container enclosure in the chamber and the thermal source is configured to control the temperature of the biological substance. In some variations, a controller may include a processor and memory. The controller may be configured to control the thermal source. In some variations, the thermal source may comprise a Peltier element. In some variations, the temperature control device may further comprise an agitator configured to agitate the container enclosure. In some variations, the temperature control device may further comprise a reader configured to receive one or more of biological substance data and the measured temperature from one or more of the identifier and the temperature sensor.

Also described herein is a container enclosure for use in thawing a biological substance comprising an adapter configured to receive a container comprising the biological substance. The adapter may comprise an adapter temperature sensor configured to measure the temperature of the biological substance, and an identifier for the biological substance.

In some variations, the adapter may comprise a protrusion configured to releasably contact the container. In some variations, the adapter may comprise a connector coupled to the temperature sensor and disposed on an outer surface of the adapter. In some variations, the adapter may comprise a sleeve.

In some variations, a system may comprise the container enclosure and further comprise a temperature control device comprising a thermal source, a thermal conductor, and a chamber configured to receive the container enclosure.

In some variations, the thermal source may be configured to control a temperature of the biological substance.

In some variations, the thermal conductor may comprise a thermal conductor temperature sensor configured to measure the temperature of the thermal conductor. In some variations, the thermal source may comprise a Peltier element. In some variations, the temperature control device may further comprise an agitator configured to agitate the container enclosure. In some variations, a controller may include a processor and memory. The controller may be configured to control the thermal source.

In some variations, the temperature control device may further comprise a reader configured to receive one or more of biological substance data and the measured temperature from one or more of the identifier and the temperature sensor. In some variations, the housing may comprise a handle. In some variations, the housing may be configured to transition between an open configuration and a closed configuration. The closed configuration may be configured to hold the container enclosure within the chamber. In some variations, the adapter may comprise a thermally conductive material. In some variations, the adapter may comprise a sleeve. In some variations, the thermal conductor may comprise one or more of a fluid, gel, metal, ceramic, polymer, and silicone.

In some variations, the adapter may comprise one or more of a metal, ceramic, polymer, and silicone. In some variations, the adapter may comprise a rigid material. In some variations, the temperature sensor may comprise a thermocouple. In some variations, one or more of the thermal conductor and the adapter may be configured for single use.

Also described herein is a system comprising a plurality of temperature control devices configured to control a temperature of a biological substance. Each device may comprise a container enclosure configured to receive a container comprising a biological substance, a temperature sensor configured to measure a temperature of the biological substance, an identifier for the biological substance, and a controller coupled to the plurality of temperature control devices. The controller may comprise a processor and memory. The controller may be configured to receive the temperature corresponding to one or more of the biological substances from one or more of the temperature control devices, and control the temperature of one or more of the biological substances using one or more of the temperature control devices based on its respective temperature sensor.

In some variations, each temperature control device may comprise an agitator. The controller may be configured to control agitation of one or more of the temperature control devices based on its respective temperature sensor. In some variations, controlling the temperature of one or more of the biological substances may comprise controlling the temperature of the biological substance between down to about −80° C. and up to about 37° C.

Also described herein is a system for controlling a temperature of a biological substance comprising an adapter configured to receive a container comprising the biological substance, a thermal conductor in thermal communication with the adapter, a thermal source in thermal communication with the thermal conductor, a temperature sensor configured to measure the temperature of the biological substance, and an identifier for the biological substance.

Also described herein is a method for thawing a biological substance comprising positioning a container comprising a biological substance in an adapter, where the biological substance is in a frozen state, positioning the adapter with the biological substance in a chamber such that the enclosed biological substance is in thermal communication with a first heating assembly located within the housing, and activating the heating assembly to heat and thereby thaw the enclosed biological substance. The enclosed biological substance may comprise mRNA, and the mRNA may have a post-thaw cycle threshold (Ct) value below about 30. In some variations, the post-thaw Ct value may be between about 27.0 and about 29.0.

In some variations, positioning the container in the adapter may further include positioning the container such that a side portion of the adapter overlaps a sidewall portion of the container and a bottom portion of the adapter overlaps and a bottom portion of the container. In some variations, a top portion of the container may remain uncovered. In some variations, at least one of a neck and a lip of the container may remain uncovered.

In some variations, positioning the container in the adapter may further include positioning the container in the adapter with an interference fit. In some variations, positioning the adapter in the chamber may further include positioning the adapter such that a longitudinal axis of the container is about parallel to a longitudinal axis of the chamber. In some variations, positioning the adapter may further include positioning the adapter in a cavity of a container enclosure and positioning the container enclosure in the chamber. After positioning the adapter in the cavity of the container enclosure, a portion of the container may overlap with a temperature sensor of the container enclosure. In some variations, positioning the container in the adapter may include positioning the container such that the adapter holds the container in an upright position.

Also described herein is a method of heating a biological substance comprising positioning a container comprising a biological substance in an adapter, positioning the adapter with the container in a container enclosure, placing the container enclosure into a chamber of a thawing device, heating the enclosed biological substance to an endpoint temperature using the thawing device, and removing the container enclosure from the chamber of the thawing device after the biological substance has reached the endpoint temperature. The biological substance may be in a frozen state. The container enclosure may comprise a temperature sensor configured to measure a temperature of the biological substance. Positioning the adapter may result in at least a portion of the container overlapping the temperature sensor.

In some variations, heating the biological substance may further comprise heating a thermal conductor positioned in the chamber. In some variations, the biological substance may comprise mRNA and the endpoint temperature may be 4° C. In some variations, the biological substance may comprise blood plasma and the endpoint temperature may be 15° C.

In some variations, positioning the adapter in the container enclosure may include positioning the adapter such that the adapter holds the container in alignment with the temperature sensor. In some variations, the adapter may hold the container in an upright position in the container enclosure. In some variations, the adapter may maintain the container in a position in which a longitudinal axis of the container is parallel to a longitudinal axis of the chamber when the container enclosure is positioned within the chamber.

Also described herein is a system for thawing a biological substance comprising an adapter configured to receive a container comprising the biological substance, a container enclosure comprising a cavity configured to receive the adapter and a temperature sensor configured to measure a temperature of the biological substance, and an identifier for the biological substance. The temperature sensor may overlie a portion of the cavity.

In some variations, the adapter may be configured to maintain a position of the container relative to the temperature sensor during thawing. In some variations, the adapter may be configured to maintain the container in an upright position during thawing. In some variations, the adapter may comprise a thermally conductive material.

DETAILED DESCRIPTION

Figure 1:
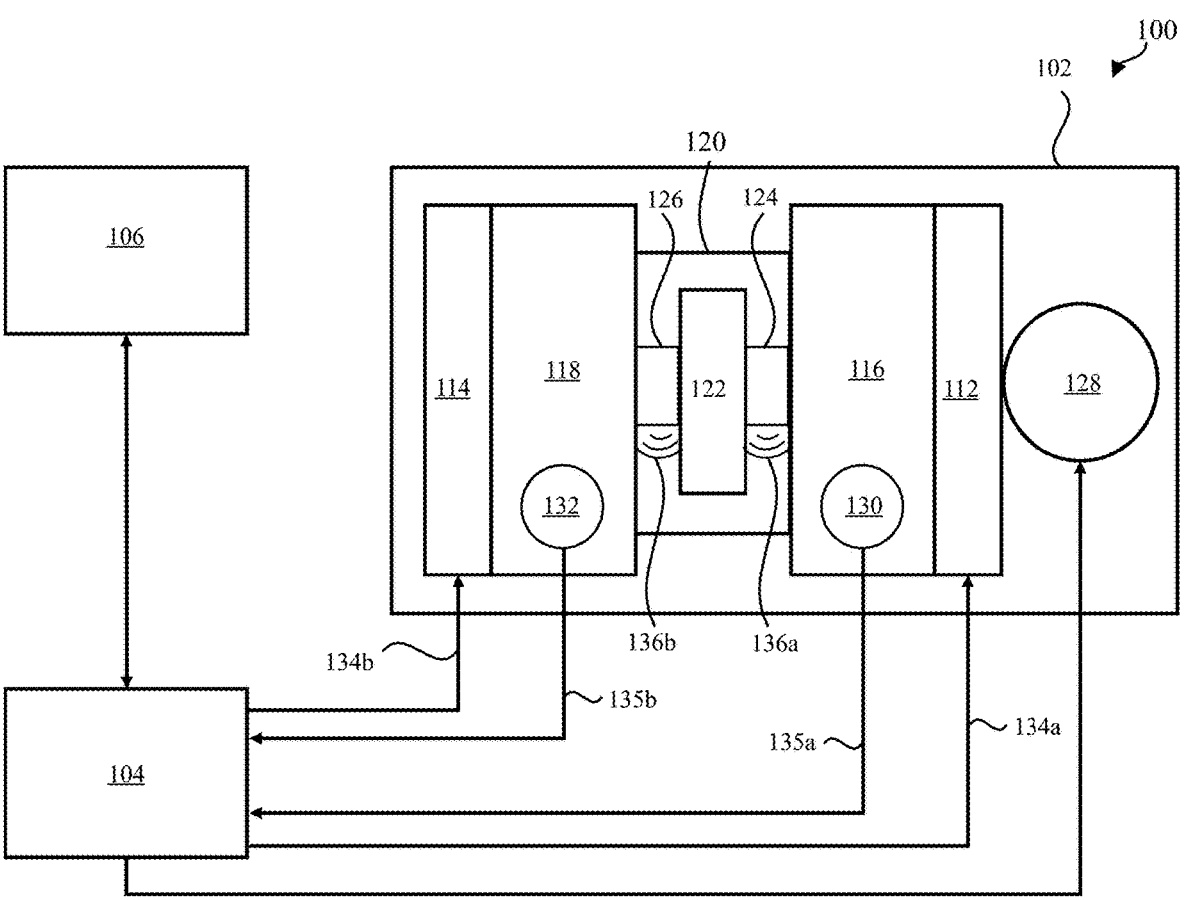
FIG. 1 is a block diagram of an illustrative variation of a temperature control system configured to control a temperature of a biological substance.

Conventional systems for thawing a frozen biological substance operate by placing a bag containing the biological substance in contact with heated water (e.g., water baths or water bladders). Heat is transferred from the water to the biological substance over a selected time duration to thaw the biological substance to a desired temperature range. However, these systems do not individually monitor the temperature of each bag for quality control during the thawing process. Typically, the ambient temperature of the water bath or water bladder is monitored during the thawing process. It may also be difficult to ensure that small volume biological substances do not overheat while thawing in heated water. Thus, it may be difficult to achieve reproducible and consistent thawing of the biological substances, creating opportunities for errors that may be harmful to patients.

Some biological substances such as mRNA are fragile and degrade easily at room temperature. For example, ribonucleases are commonly found even within controlled environments such as a clinical lab, and contact with ribonucleases may degrade mRNA. Accordingly, uncontrolled thawing may accelerate a degradation process. The devices, systems, and methods described herein may reduce degradation of low volumes of fragile biological substances such as mRNA.

Described herein are devices, systems, and methods for controlling a temperature of a biological substance, such as, for example, a low volume biological substance. A low volume biological substance (e.g., vaccine, medication, prophylactic, plasma, glycerolized blood, red blood corpuscles (RBCs)) that is frozen and stored in a container may need to be thawed to a predetermined temperature before it is suitable for its intended application. At times, a low volume biological substance may need to be cooled or maintained at a designated temperature prior to use. Thus, systems for controlling a temperature (e.g., heating, cooling, maintaining at a designated temperature) of a low volume biological substance may be critical to effective use of such substances.

Generally, a system for controlling the temperature of the biological substance may comprise a thermal source such as a heating and/or cooling element. The thermal source may be in thermal communication with a container enclosure configured to function as a thermal interface between the thermal source and the biological substance. For example, the container may be placed within the container enclosure and the container enclosure may be placed in thermal communication with the thermal source. The thermal source may generate thermal energy such as heat that will be transmitted through the container enclosure to alter (increase, decrease) or maintain the temperature of the biological substance. A controller coupled to the thermal source may be configured to control a temperature of the biological substance by, for example, instructing the thermal source to generate thermal energy to thaw a frozen biological substance to room temperature and maintain that temperature for a predetermined amount of time using closed-loop temperature control.

In some variations, a biological substance may include, but is not limited to, mRNA vaccine, DNA vaccine, exosome, liquid biopsy, cryo-preserved tissue, therapeutic, prophylactic, and cell therapy product, whole blood, blood products, plasma derivatives, breast milk, ovaries, eggs, sperm, embryos, tissue, drugs, cells, such as chimeric antigen receptors t-cell (CAR-T) or other T-cells, molecular reagents, antibodies, combinations thereof, and the like.

I. Systems

The systems (e.g., temperature control system) described herein may be configured to control the temperature of a biological substance (e.g., heat or thaw, cool, maintain at a desired set point) disposed within a container. The temperature control systems may comprise a container enclosure and a temperature control device (e.g., thawing device, cooling device) comprising a thermal source. The temperature control device may comprise a controller, or may be coupled to an external controller, configured to control the temperature of the biological substance. The thermal source may be provided in thermal communication with the biological substance in a number of configurations. For example, a container enclosure comprising a bag as described in more detail with respect to FIGS. 2-4 may be configured to receive the container and be placed within a chamber of the temperature control device. In other variations, a container enclosure comprising a conductive housing and an adapter as described in more detail with respect to FIGS. 5A-7B may be placed within a chamber of a temperature control device. In yet other variations, a container enclosure comprising an adapter as described in more detail with respect to FIGS. 8A-9B may be placed within a chamber of a temperature control device. The container enclosure may function as a thermal interface between the thermal source and the biological substance and may facilitate placement and alignment of the container within the temperature control device.

As mentioned above, the temperature control systems described herein may regulate the temperature (e.g., thaw from frozen, warm, maintain, cool) of biological substances such as, for example, mRNA vaccines and cryo-preserved tissues, stored in containers such as low volume vials (e.g., having a volume of less than about 100 mL). FIG. 1 is a block diagram of an illustrative variation of a temperature control system (100) configured to control a temperature of a biological substance. As shown there, the system (100) may comprise a chamber (102) (e.g., dry thawing chamber), a controller (104), a user interface (106), thermal sources (112, 114), thermal conductors (116, 118), a container enclosure (120), a biological substance (122), temperature sensors (124, 126, 130, 132), and an agitator (128).

In some variations, the chamber (102) may comprise one or more thermal sources (112, 114) (e.g., heating and/or cooling element such as a Peltier element or other heater or cooler) configured to be in thermal communication with a thermal conductor (116, 118) (e.g., enclosed gel, water). The chamber (102) may be configured to receive the container enclosure (120) having the biological substance (122) disposed therein. In some variations, one or more of the thermal conductors (116, 118) may be configured to be positioned in contact with the container enclosure (120) surrounding or otherwise containing therein an enclosed biological substance (122) (e.g., container having a biological substance). In some variations, one or more of the thermal conductors (116, 118) may be part of the container enclosure (120). In some variations, one or both of the thermal conductors (116, 118) may be heating cushions. The heating cushions may be formed from a material of relatively high thermal conductivity and may be filled with fluid. In some variations, the thermal conductors (116, 118) may be formed from a reversibly deformable material. The container enclosure (120) may function as a thermal interface between the thermal source (112, 114) and the biological substance (122).

In some variations, the system may comprise one or more temperature sensors for monitoring (e.g., measuring) a temperature of the biological substance (122) as described in more detail herein, and one or more temperature sensors (130, 132) for monitoring the temperature of the thermal conductors (116, 118). Additionally or alternatively, the system (100) may comprise an optional agitator (128) in mechanical communication with the container enclosure (120). In some variations, the controller (104) may be configured to control the thermal source (112, 114) and the temperature sensors by wired and/or wireless communication links (134a, 134b, 135a, 135b). The controller (104) may further be configured to control the temperature of the biological substance based at least on the temperature measurements.

In some variations, the temperature sensors may have different configurations. FIG. 1 illustrates a first configuration of temperature sensors including first contact temperature sensors (124, 126) and second contact temperature sensors (130,132). For example, first contact temperature sensors (124, 126) may be integrated with, or secured to, the container enclosure (120) (e.g., secured to an inner or outer surface of the container enclosure (120), secured to a portion of the container enclosure (120), such as, for example, an adapter or a conductive housing) for measurement of the temperature of the biological substance. The first contact temperature sensors (124, 126) may be positioned on the same side or surface of the container enclosure (120) or on opposite sides or surfaces of the container closure (120). For example, in some variations, each of the first contact temperature sensors (124, 126) may be positioned on an inner surface of the container enclosure (120) (e.g., the same inner surface or opposed inner surfaces) of the container enclosure (120) for contact with the container (e.g., vial) holding the biological substance (122). In another variation, each of the first contact temperature sensors (124, 126) may be positioned on outer surfaces of the container enclosure (120). As another example, one first contact temperature sensor (124, 126) may be positioned on an inner surface of the container enclosure (120) and the other first contact temperature sensor (124, 126) may be positioned on an outer surface of the container enclosure (120). In some variations, one or more of the first contact temperature sensors (124, 126) may be positioned on a surface (e.g., internal surface, bottom) of an adapter and/or a conductive housing of a container enclosure. In some variations, a single first contact temperature sensor (124,126) may be used and it may be disposed in any of the locations described herein.

As further shown in FIG. 1, second contact temperature sensors (130, 132) may be integrated with, or secured to, thermal conductors (116, 118) (e.g., an inner or outer surface of the thermal conductor) for measurement of the temperature of thereof. As shown, second contact temperature sensors (130, 132) may be positioned on outer surfaces of each thermal conductor (116, 118). Additionally or alternatively, the location and/or number of the second contact temperature sensors (130, 132) may be varied. For example, each of the second temperature sensors (130, 132) may be positioned on inner surfaces of its corresponding thermal conductors (116, 118) for contact with the container enclosure (120), and thus the container holding the biological substance (122). As another example, one of the second contact temperature sensors (130, 132) may be positioned on an inner surface of its corresponding thermal conductor (116, 118) and the other second contact temperature sensor (130, 132) may be positioned on an outer surface of its corresponding thermal conductor (116, 118). In another aspect, the second contact temperature sensors may be distributed between the thermal conductors in any combination. In some variations, a single second contact temperature sensor (130,132) may be used, and it may be disposed in any of the locations described herein.

In some variations, the system (100) may include one or more non-contact temperature sensors. For example, the non-contact temperature sensors may be arranged at a predetermined distance from one or more targets (e.g., the biological substance, the container enclosure or a portion thereof (e.g., an adapter, a conductive housing or any portion thereof) and configured to measure a temperature of the target(s). As an example, non-contact temperature sensors may be configured to measure electromagnetic radiation emitted from the enclosure (e.g., infrared radiation). In some variations, one or more non-contact temperature sensors may be used in combination with one or more contact temperature sensors. In some variations, the contact temperature sensors (e.g., first contact temperature sensors (124, 126) and second contact temperature sensors (130, 132)) and non-contact temperature sensors may communicate with the controller (104) via communication links that are wired and/or wireless. In some variations, the systems, devices, and methods described herein may comprise one or more components, steps, and features of any of the devices and systems described in International Application No. PCT/US2019/031215, filed on May 7, 2019, the entirety of which is hereby incorporated by reference herein.

In some variations, one or more of the contact temperature sensors may be integrated with a radiofrequency identification (RFID) tag mounted to the container enclosure or any portion thereof (e.g., an adapter, a conductive housing or a portion thereof). Mounting may include being printed on a surface, adhered to a surface by an adhesive, combinations thereof, and the like. In further variations, respective temperature sensors may be a sensor of a smart label, as discussed in International Patent Application No. WO 2016/023034, filed Aug. 10, 2015, entitled "Smart Bag Used In Sensing Physiological And/Or Physical Parameters Of Bags Containing Biological Substance," the entirety of which is hereby incorporated by reference. The RFID tag may be configured to wirelessly transmit data (e.g., temperature measurements, authentication information) to a receiver in communication with the controller. In some variations, the non-contact temperature sensors may also be configured to communicate wirelessly with the controller. Exemplary variations of RFID tags are described in more detail in International Patent Application No. WO 2016/023034, which is hereby incorporated by reference in its entirety.

In some variations, two or more temperature sensors selected from contact temperature sensors or non-contact temperature sensors may be used to improve the accuracy of temperature measurements and provide redundancy. For example, in some variations, the controller (104) may receive temperature data from a contact temperature sensor and temperature data from a non-contact temperature sensor, and may use both to control a temperature regulation process, which may result in more accurate and precise control of the temperature of the biological substance. As another example, faulty temperature sensors may be identified using a plurality of sensors. For instance, temperature measurements of the biological substance (122) acquired by two different temperature sensors may be compared to one another. If a deviation is observed between these measurements, the controller (104) may output an alarm (e.g., an audio and/or visual signal) for replacement of the faulty temperature sensor. The alarm may also include a signal transmitted to the controller (104) configured to control the controller 104 to cease measurement using the faulty temperature sensor in a thawing process. Redundancy may be provided by having the controller (104) employ a non-faulty temperature sensor in place of the faulty temperature sensor for control of a thawing processes. In this manner, faulty temperature sensors may be identified and replaced while avoiding the use of inaccurate temperature measurements for control of a thawing process.

In some variations, the system may be configured to provide a failsafe functionality in which one or both of the thermal sources (112, 114) inhibit heat generation when the temperature measured at the selected thermal source (112, 114) and/or the thermal conductor (116, 118) exceed predetermined threshold temperatures. For example, the system may comprise one or more failsafe temperature sensors. In some variations, the failsafe temperature sensors may be disposed on the same surfaces as the other temperature sensors described herein (e.g., contact temperature sensor, non-contact temperature sensor) or on other surfaces, such as on the thermal source itself. In some variations, a failsafe signal may be configured to terminate delivery of electrical power independently to thermal source (112, 114) using the power supply (107). For example, if a first failsafe signal is transmitted to the power supply (107) in response to a temperature measurement made by a failsafe temperature sensor, delivery of electrical power may be terminated to one or more of the thermal source (112, 114). In some variations, the failsafe temperature sensors may comprise one or more of a thermocouple and a thermistor.

In some variations, the predetermined failsafe threshold temperature value may be different for the thermal source (112, 114) and the thermal conductor (116, 118). For example, the predetermined failsafe threshold temperature for the thermal source (112, 114) may be about 105° C., and the predetermined failsafe threshold temperature for the thermal conductor (116, 118) may be about 40° C. for thermocouple failsafe temperature sensors and about 40° C. to about 60° C. for thermistor failsafe temperature sensors (e.g., negative temperature coefficient (NTC) thermistors and positive temperature coefficient (PTC) thermistors). Thus, failsafe temperature sensors may help prevent damage to the biological substance (122), container enclosure (120), and/or other components of the temperature control system (100).

In some variations, the container enclosure (120) containing the biological substance (122) may be positioned in contact with the one or more thermal conductors (116, 118), while in other variations the thermal conductors may be part of the container enclosure (120) and may be thermally coupled to the biological substance directly, or via an adapter. The thermal conductor (116, 118) may be deformable to accommodate the shape and volume of the container enclosure (120), the adapter, and/or the container holding the biological substance (122). In this manner, contact between the container enclosure (120) or an adapter of the container enclosure and the thermal conductor (116, 118) may be ensured, promoting heat transfer from one or more thermal conductor (116, 118) to the biological substance (122). In some variations, a thermal conductor may be fixed to a thermal source, as described in more detail with respect to FIGS. 2 and 9. In other variations, the thermal conductor may be removably coupled to a thermal source, as described in more detail with respect to FIGS. 6 and 7.

In some variations, the controller (104) may transmit first command signals to a first thermal source (112) and a second thermal source (114) to cause the first thermal source (112) and the second thermal source (114), respectively, to generate thermal energy, at least a portion of which is transferred through the first thermal conductor (116) and the second thermal conductor (118), respectively, to the biological substance (122). The temperature of a component may be measured by one or more contact temperature sensors (e.g., first contact temperature sensors (124, 126) and/or second contact temperature sensors (130, 132)) and/or one or more non-contact temperature sensors and transmitted to the controller (104) via a communication link. The component may be at least one of the thermal conductor (116, 118), the container enclosure (120) itself or portion thereof, and the biological substance (122). In some variations, the temperature of a portion of the container enclosure (120) may be approximately equal to the temperature of the biological substance (122). Accordingly, the temperature of the biological substance (122) may be measured via measurement of the temperature of a portion of the container enclosure (120).

In some variations, the controller (104) may receive temperature data corresponding to one or more of the thermal source (112, 114) and thermal conductor (116, 118), as feedback for closed-loop control of the thermal source (112, 114) in order to provide a predetermined temperature-time response. Additionally or alternatively, the controller (104) may receive temperature data corresponding to the biological substance (122) for closed-loop feedback control of the thermal source (112, 114). Thus, regardless of the geometry or volume of the biological substance (122), thermal energy applied for controlling a temperature of the biological substance (122) may be controlled to avoid over-heating or under-heating the biological substance (122). Controlling a temperature of the biological substance may refer to heating the biological substance (122), cooling the biological substance (122), and/or maintaining the temperature of the biological substance (122) at a set-point or within a predetermined range.

As mentioned above, the temperature control system (100) may optionally comprise an agitator (128). The agitator (128) may be configured to provide substantially uniform heat transfer. For example, in some variations, an agitator (128) may comprise a cam, and motor configured to pivot, a support holding a container to agitate the biological substance within the chamber. In other variations, the agitator (128) may comprise a motor configured to vibrate a support holding a container. The controller (104) may be configured to transmit second command signals to the agitator (128) to agitate the biological substance (122). Substantially uniform heat transfer may include a difference between a maximum and minimum temperature of the biological substance that is less than or equal to a predetermined temperature difference (e.g., between about 0.5° C. to about 2° C.). In some variations, an agitator (128) may agitate the biological substance based on a predetermined weight threshold and/or volume threshold. For example, agitation during a temperature regulation process for a low volume biological substance (e.g., mRNA vaccine) may be inhibited, but agitation may be applied during a temperature regulation process for a blood bag. In some variations, an operator may manually select agitation as desired, and in some instances, it may be desirable not to utilize agitation for low volume biological substances. In some variations, the controller (104) may be configured to provide commands to a thermal source (112, 114) and an agitator (128) based at least in part on temperature sensor measurements and a method of regulating a temperature of a biological substance, as described in more detail with respect to FIG. 13. In some variations, an operator may select a desired temperature control (e.g., thawing) program from a list of predetermined thawing programs stored in memory in communication with the controller. Additionally or alternatively, a temperature control program may be selected by the controller (104) from a plurality of predetermined temperature control programs. As an example, the predetermined temperature control program may be selected by the controller based upon one or more of a volume, weight, and type of biological substance.

In some variations, the controller may receive the volume and/or weight of the biological substance in a variety of ways. For example, the controller may receive the volume and/or weight from manual input by an operator using a user input device (e.g., barcode reader, optical character reader, radiofrequency tag reader). The user input device may be configured to read the volume of the biological substance from markings on a container enclosure itself representing the volume and/or weight (e.g., a barcode, text) or an identifier secured to the enclosure (e.g., an RFID tag) that electronically stores data including the volume and/or weight above. In other variations, the temperature control system itself (e.g., the temperature control device) may be configured to measure the weight of the biological substance.

In some variations, the controller may be implemented in digital electronic circuitry, in computer hardware, firmware, and/or software. The implementation may be as a computer program product. The implementation may, for example, be in a machine-readable storage device, for execution by, or to control the operation of, data processing apparatus. The implementation may, for example, be a programmable processor, a computer, and/or multiple computers.

A computer program may be written in any form of programming language, including compiled and/or interpreted languages, and the computer program may be deployed in any form, including as a stand-alone program or as a subroutine, element, and/or other unit suitable for use in a computing environment. A computer program may be deployed to be executed on one computer or on multiple computers at one site.

Processors suitable for the execution of a computer program may include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer may include, may be operatively coupled to receive data from and/or transfer data to one or more mass storage devices for storing data (e.g., magnetic, magneto-optical disks, or optical disks). Information carriers suitable for embodying computer program instructions and data include all forms of non-volatile memory, including by way of example semiconductor memory devices. The information carriers may, for example, be EPROM, EEPROM, flash memory devices, magnetic disks, internal hard disks, removable disks, magneto-optical disks, CD-ROM, and/or DVD-ROM disks. The processor and the memory may be supplemented by, and/or incorporated in special purpose logic circuitry.

In some variations, the temperature control system (100) may comprise a vacuum mechanism, such as a vacuum pump in fluid communication with an interior of the container enclosure (e.g., via a one-way valve) or a portion thereof. For example, the vacuum pump may be activated to remove air from the interior of the container enclosure and create a partial vacuum. By reducing the pressure within the container enclosure, as compared to the ambient pressure outside the container enclosure, the container enclosure may be urged into contact with the enclosure by the ambient pressure. In this manner, the accuracy of temperature measurements acquired by temperature sensor(s) mounted to the container enclosure may be improved.

Temperature Control Device

Figure 2A:
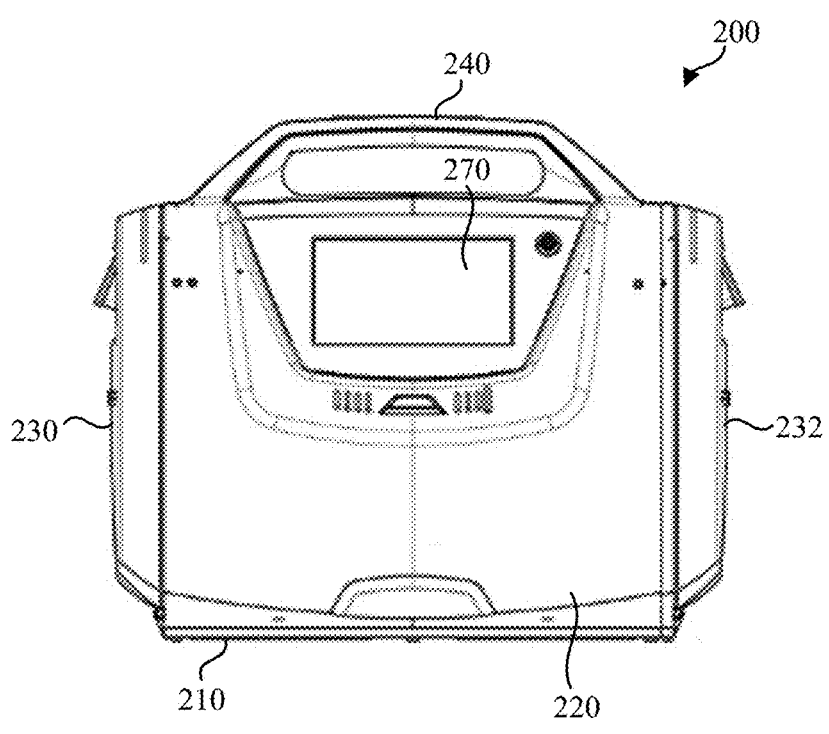
FIG. 2A is a side view of an illustrative variation of a temperature device for use in a temperature control system configured to control a temperature of a biological substance in a closed configuration.
Figure 2B:
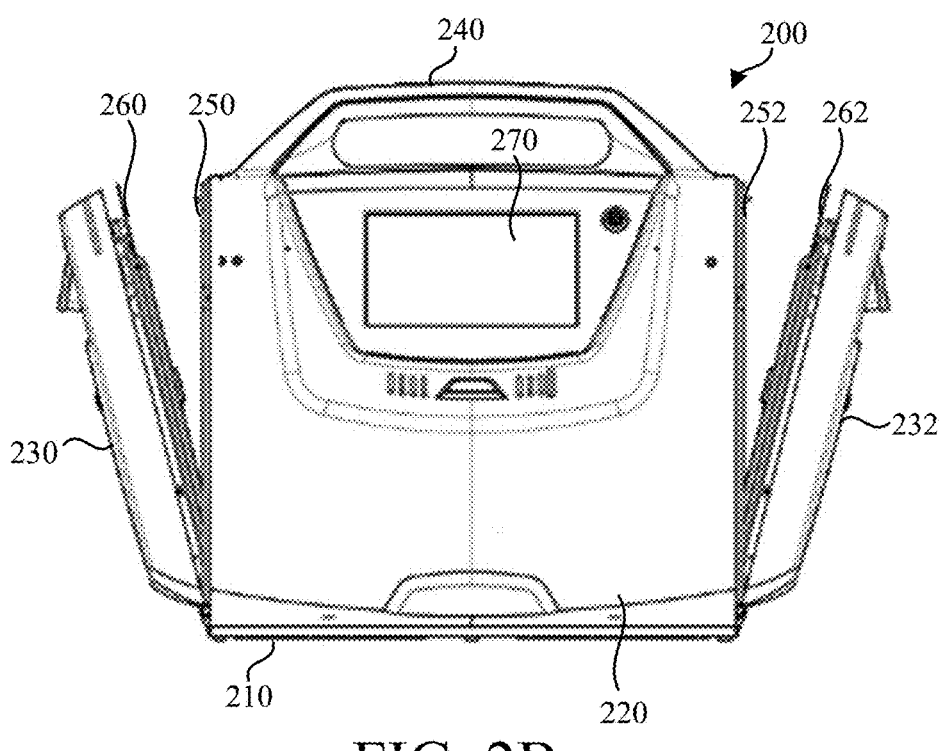
FIG. 2B is a side view of the device shown in FIG. 2A in an open configuration.
Figure 14:
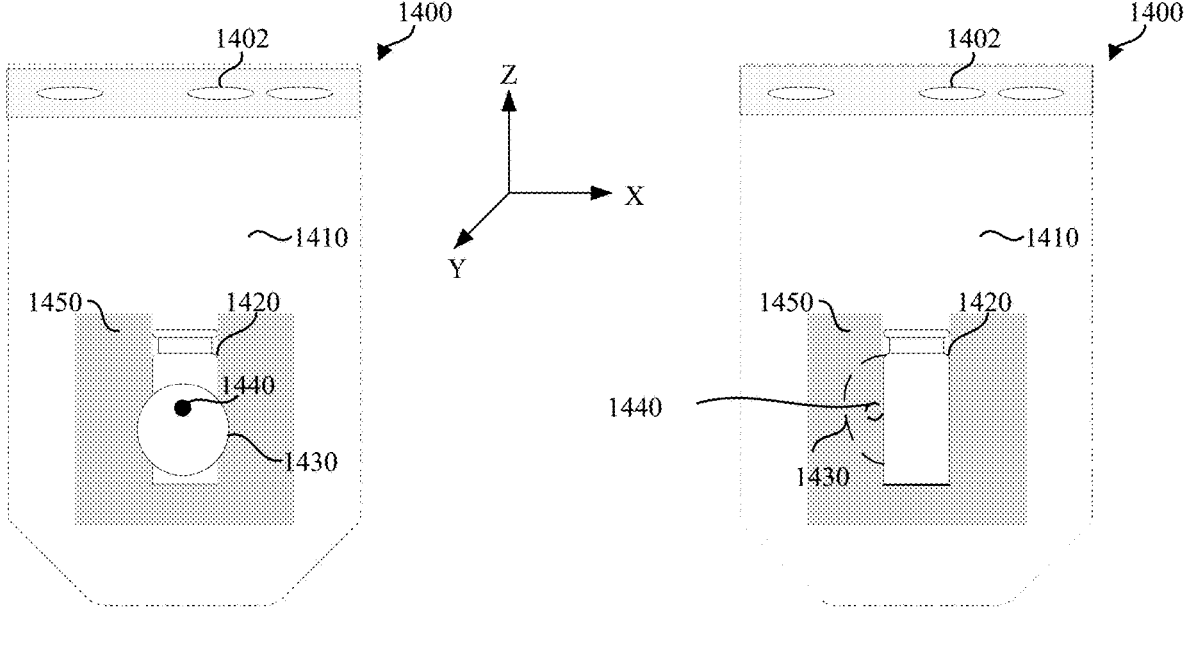
FIGS. 14A and 14B depict a schematic cross-sectional view of an illustrative variation of a container enclosure.

In some variations, the temperature control device (e.g., a dry thawing device) for controlling a temperature of a biological substance may be compact and portable. FIG. 2A is a side view of an illustrative variation of a temperature control device (200) configured to control a temperature of a biological substance in a closed configuration. FIG. 2B is a side view of the device (200) shown in FIG. 2A in an open configuration. In some variations, the temperature control device (200) in the open configuration may receive a container enclosure (300, 400) such as shown and described with respect to FIGS. 3, 4, and 14. In some variations, the system (200) may comprise a housing (210) comprising a main body (220), a first door (230), a second door (232), a handle (240), and a user interface (270). The housing (210) may further enclose a first chamber (250) and a second chamber (252). The first and second doors (230, 232) enable access to an interior of the respective first and second chambers (250, 252), thereby allowing an operator to insert or remove a container enclosure (260, 262) (e.g., container enclosure (300, 400, 1400)) having the biological substance contained therein. Each of the first and second doors (230, 232) may comprise a respective thermal source (114, 116) coupled thereto as described herein. In some variations, the user interface (270) may comprise a display and a user input device (e.g., keyboard, mouse, trackball, optical or resistive touch screen) by which the operator may provide input to the system (200). In some variations, input from the operator may, for example, be received in any form, including acoustic, speech, and/or tactile input.

Figures 2C, 2D:
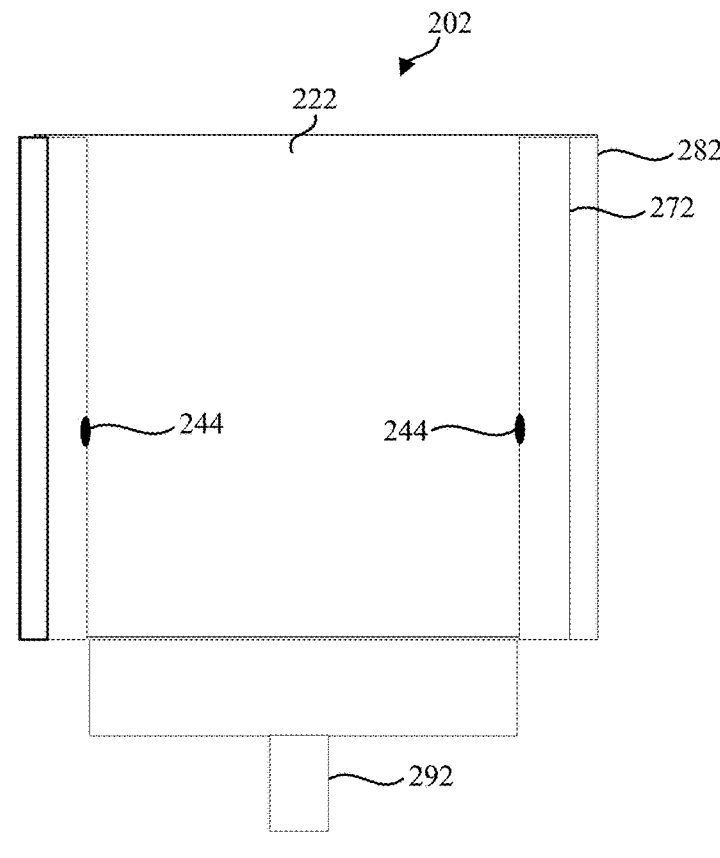
FIG. 2C is a schematic cross-sectional side view of an illustrative variation of a temperature control device configured to control a temperature of a biological substance.
FIG. 2D is a schematic cross-sectional side view of an illustrative variation of a temperature control device configured to control a temperature of a biological substance.

FIGS. 2C and 2D are schematic cross-sectional side views of additional variations of a temperature control device configured to control a temperature of a biological substance. The temperature control device (202) of FIG. 2C may be used with a container enclosure and a container to regulate the temperature of a biological substance inside. For example, the temperature control device (202) comprising a thermal source (282) to control a temperature of a biological substance, a sidewall (272), and an agitator (292). The sidewall (272) and/or thermal source (282) may comprise a temperature sensor (244). In some variations, a container enclosure may be received within a chamber (222) formed between the sidewalls (272). For example, a conductive housing receiving (e.g. holding) an adapter and a container may be configured to be received in the chamber (222) of the temperature control device (202), which is formed between the sidewalls (272). In this manner, the thermal source (282) may be releasably coupled to, and in thermal communication with, the conductive housing. In this way, the temperature control device (202) may control the temperature of the biological substance in the container.

The temperature control device (204) of FIG. 2D may be used with a container enclosure (e.g., adapter) and container to regulate a temperature of a biological substance inside. For example, a temperature control device (204) comprising a thermal source (282), and an agitator (292), a thermal conductor (212) having a first portion (212a) and a second portion (212b), a support (214), an identifier (236), and a temperature sensor (244). For example, the thermal conductor (212) may be rectangular in shape with a first conductor portion (212a) and a second conductor portion (212b). In other variations, the thermal conductor may be a different shape, such as, for example, cylindrical. A container may be received within an adapter of the container enclosure, and the container enclosure may be received within a cavity (223) formed between the first portion of the thermal conductor (212a) and the second portion of the thermal conductor (212b). For example, the thermal conductor (212) may be configured to receive (e.g. hold) the adapter and the container may be configured to be received in the cavity (223) of the temperature control device (204), which is formed between the first portion of the thermal conductor (212a) and the second portion of the thermal conductor (212b). In this manner, the thermal source (282) may be in thermal communication with the thermal conductor (212). In this way, the temperature control device (204) may control the temperature of the biological substance in the container. In some variations, each of the temperature control devices (202, 204) may be durable components while the components disposed within the devices (202, 204) may be limited use (e.g., single use) components. In other variations, the temperature control devices (202, 204) and the components disposed within the devices (202, 204) may all be limited use (e.g., single use components) or may all be durable components.

Container Enclosure

Generally, containers (e.g., vials) having a biological substance therein may be held, disposed, received, or otherwise positioned within a container enclosure, which may in turn, be held, disposed, received, or otherwise positioned within a chamber of a temperature control device, such as that shown in FIGS. 2A-2D. For example, the container enclosure may be placed within a chamber (250) of the temperature control system (200) and, may either itself comprise, or may be placed in contact with, a thermal conductor. Accordingly, the container enclosure may function as a thermal interface to facilitate temperature control (e.g., heating or cooling) of the biological substance using a temperature control device (e.g., device (200, 202, 204)). For example, the container enclosure may function as a thermal interface between a thermal source (e.g., heater, cooler, or combination thereof) and the biological substance. In some variations, the container enclosure may comprise a temperature sensor and an identifier to measure temperature and aid in identification and tracking of the biological substance, respectively. Furthermore, the container enclosure may contain the biological substance within the container enclosure, or a portion thereof in the event that the container itself ruptures or breaks, thereby reducing contamination.

In some variations, the container enclosure may enable temperature monitoring, temperature distribution, and identification. For example, the container enclosure may comprise one or more temperature sensors configured to measure a temperature of the biological substance. The container enclosure may further include a unique identifier (e.g., RFID tag, barcode, label) that may be used to track the biological substance and/or its container and/or may be used to authenticate the container enclosure. The identifier may operate utilizing one or more of passive and active identification techniques. Moreover, one or more elements of the container enclosure may be a durable component configured for multiple heating and/or cooling cycles or a consumable component (e.g., limited use, single use, disposable) configured to be used and replaced at predetermined intervals (e.g., predetermined number of heating and/or cooling cycles, monthly, yearly). For example, the container enclosure (300) may be formed from materials capable of being sterilized and reused in accordance with the requirements of domestic and/or international governing organizations and regulatory bodies. In some variations, the container enclosure may be configured to provide anti-microbial properties, whether intrinsically or through the use of coatings or additives. Examples of materials forming the container enclosure may comprise one or more of metal, ceramic, polymer, silicone, fluid, gel, combinations thereof, and the like.

Figure 3:
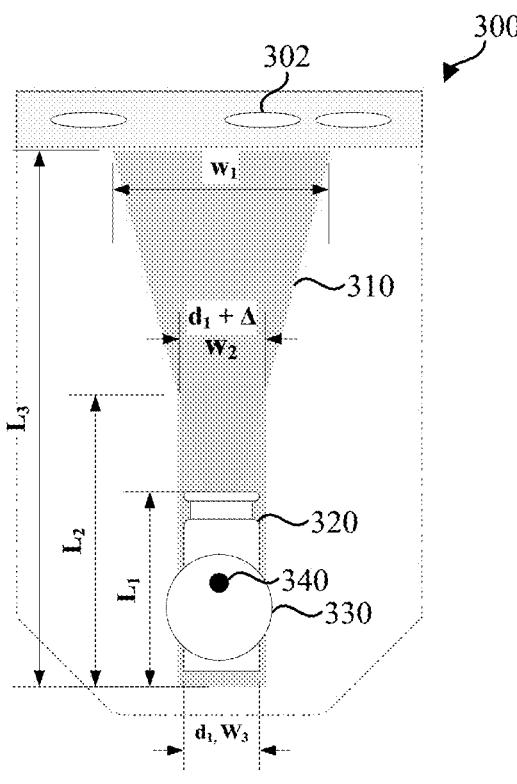
FIG. 3 is a schematic cross-sectional view of an illustrative variation of a container enclosure.

In some variations, a container enclosure may be configured to receive, for example, a low volume container of a biological substance for temperature regulation such as thawing. FIG. 3 is a schematic cross-sectional view of an illustrative variation of a container enclosure (300) (e.g., bag) that may enclose or surround a container (320). The container enclosure (300) may be configured to receive a container (320) (e.g., vial, tube, or the like) having a biological substance as described herein. The container enclosure (300) may be placed within a chamber of a temperature control device (e.g., device (200)), which may then be used to regulate the temperature of the biological substance contained therein. The container enclosure (300) may be composed of a thermally conductive material configured to transfer heat generated by the system (100) to the biological substance. In some variations, the container enclosure (300) may be configured for limited (e.g., one, between one and 10, between one and 20, etc.) use. In some variations, an opening of the container enclosure (300) may be reversibly sealed. For example, the container enclosure (300) may be opened to receive the container therein, and then may be sealed such that in the event that the container (320) leaks or ruptures during the thawing process, the container enclosure (300) may isolate the biological substance from the temperature control device, thereby minimizing contamination and waste.

As depicted in FIG. 3, the container enclosure may comprise a coupling mechanism (302), a cavity (310), an identifier (330) of a biological substance (e.g., RFID tag) as described in more detail herein, and a temperature sensor (340) configured to measure a temperature of the biological substance. While depicted in FIG. 3 with a single temperature sensor (340) and identifier (330), it should be appreciated that any of the container enclosures described herein may comprise a plurality of temperature sensors and/or identifiers, such as, for example, two, three, four, five, six, seven, eight, or more. The coupling mechanism (302) may be configured to reversibly close the container enclosure (302) for insertion and removal of a container of biological substance. The coupling mechanism (302) may also be configured to aid in attaching and/or releasably coupling the container enclosure (300) to chamber of a temperature control device such as device (200). For example, the coupling mechanism (302) may comprise one or more of holes, fasteners, hooks, adhesives, reversible adhesives, interlocking grooves and ridges, magnets, combinations thereof, and the like. For example, in one variation, the coupling mechanism (302) may comprise interlocking grooves and ridges to reversibly close the container enclosure (302) and holes through which hooks of a corresponding thawing device (not shown) may be placed to support and properly position the container enclosure, and thus the container (320) and biological substance therein, within a chamber of a temperature control device. In some variations, the coupling mechanism (302) may be configured to form a seal, such as, for example, a hermetic seal.

The cavity (310) of the container enclosure (300) may be configured to receive a container (320). In some variations, the cavity (310) may comprise a shape configured to direct the container (320) to a predetermined position and location within the enclosure (300). For example, as shown in FIG. 3, the cavity (310) may comprise a funnel shape that enables an operator to easily place the container (320) into the enclosure (300) and facilitates proper placement of the container (320) within the container enclosure (300) for temperature regulation. Thus, in this variation, the angled or tapered edges of the top portion of the cavity (310) may guide the container (320) to a predetermined position and orientation (e.g., upright at a bottom-center portion of the enclosure (300)).

In some variations, the cavity (310) may comprise a first cavity width $w_1$ and a second cavity width $w_2$ (e.g., $d_1+\Delta$) that is smaller than the first cavity width $w_1$. The diameter $d_1$ of a container is described in more detail herein. In some variations, the first cavity width $w_1$ may be equal to or less than about 155 mm. For example, the first cavity width $w_1$ may be equal to or less than about 145 mm, equal to or less than about 135 mm, equal to or less than about 125 mm, equal to or less than about 115 mm, equal to or less than about 105 mm, equal to or less than about 95 mm, equal to or less than about 85 mm, equal to or less than about 75 mm, or equal to or less than about 65 mm. In some variations, the first cavity width $w_1$ may be between about 155 mm and about 65 mm, including all values and sub-ranges therein. For example, the first cavity width $w_1$ may be between about 145 mm and about 75 mm, between about 135 mm and about 85 mm, between about 125 mm and about 95 mm, or between about 115 mm and about 105 mm. In some variations, the second cavity width $w_2$ may be between about 14 mm and about 57 mm, including all values and sub-ranges therein. For example, the second cavity width $w_2$ may be between about 15 mm and about 50 mm, between about 20 mm and about 45 mm, between about 25 mm and about 40 mm, or between about 30 mm and about 35 mm. The cavity (310) may define an opening of the container enclosure (300) extending along the first cavity width $w_1$. In some variations, the first cavity width $w_1$ may be less than a width of the container enclosure (300), while in other variations, the cavity width $w_1$ may be equal to the width of the container enclosure (see, e.g., FIG. 4).

The second width $w_2$ may be configured to have a predetermined tolerance A with respect to a container (320) such that the second width $w_2$ may be equal to a diameter or width the container plus the predetermined tolerance A. For example, the container (320) may have at least an interference fit with the cavity (310). In some variations, the predetermined tolerance A may be between about 5 mm and about 21 mm, including all values or sub-ranges therein. For example, the predetermined tolerance A may be between about 8 mm and about 18 mm, between about 10 mm and about 15 mm, or between about 12 mm and about 13 mm.

In some variations, the container enclosure (300) may be constructed such that the container (320) may tilt a predetermined amount relative to a longitudinal axis of the enclosure (300) while the container (320) is positioned within the cavity (310). For example, the container enclosure (300) may be configured such that the container (320) may tilt up to about 5 degrees, up to about 4 degrees, up to about 3 degrees, up to about 2 degrees, up to about 1 degree, or between about 1 degree and about 5 degrees within the cavity (310) relative to a longitudinal axis of the enclosure (300). In some variations, the container enclosure (300) may be configured such that the container (320) may not tilt relative to a longitudinal axis of the enclosure (300).

The cavity (310) may have a length $L_3$ equal to or less than a length of the container enclosure (300). In some variations, the cavity (310) may have a cavity width of $w_2$ for a length $L_2$. The cavity (310) may have a generally conical shape between an opening of the container enclosure (300) and the portion of the cavity (310) having the width $w_2$. In some variations, the reduction in width of the cavity (310) from $w_1$ to $w_2$ may have a shape that is one or more of sloped, stepped, constant, irregular, concave, convex, and the like. Alternatively, the cavity (310) may not have a funnel shape. For example, the cavity (310) may have a constant width $w_1$ along a length of the enclosure that is less than a width of the container enclosure (300).

The container (320) may comprise a length $L_1$ and diameter $d_1$ or width $w_3$, depending on cross-sectional shape. In some variations, the container (320) may comprise a diameter or width of between about 1 mm and about 5 mm, between about 5 mm and about 10 mm, between about 10 mm and about 20 mm, between about 20 mm and about 30 mm, between about 30 mm and about 40 mm, between about 40 mm and about 50 mm, between about 50 mm and about 75 mm, between about 75 mm and about 100 mm, including all ranges and sub-values in-between. In some instances, the diameter or width of the container (320) may be between about 9 mm and about 36 mm, including all values and sub-ranges therein. For example, the diameter or width may be between about 10 mm and about 35 mm, between about 15 mm and about 30 mm, or between about 20 mm and about 25 mm.

In some variations, a ratio of a diameter or width of the container (320) to a width of the cavity (310) $w_1$ may be between about 1:1 and about 5:32, including all ranges and sub-values in-between. For example, the ratio of the diameter or width of the container (320) to the width of the cavity (310) may be between about 30:32 and about 8:32, between about 25:32 and about 12:32, or between about 20:32 and about 18:32. In some variations, the length $L_1$ may be less than, equal to, or more than length $L_2$. The length $L_2$ may correspond to a lower portion of the cavity (310) configured to hold the container (320). In some variations, the length $L_1$ may be between about 50 mm and about 25 mm, including all values and sub-ranges therein. For example, the length $L_1$ may be between about 45 mm and about 30 mm, about 40 mm and about 35 mm, or between about 38 mm and about 36 mm. In some variations, the length $L_2$ may be between about 60 mm and about 25 mm, including all values and sub-ranges therein. For example, the length $L_2$ may be between about 55 mm and about 30 mm, between about 50 mm and about 35 mm, between about 45 mm and about 40 mm, or between about 44 mm and about 42 mm.

In some variations, the cavity (310) of the container enclosure (300) may be formed by heat welding predetermined portions of opposing surfaces (e.g., front, back) of the enclosure container (300) together. For example, tapered and straight lines may be welded to form a cavity (310) having a generally funnel shape. In some variations, the welding may form a cavity (310) having parallel edges without a taper.

Figure 4:
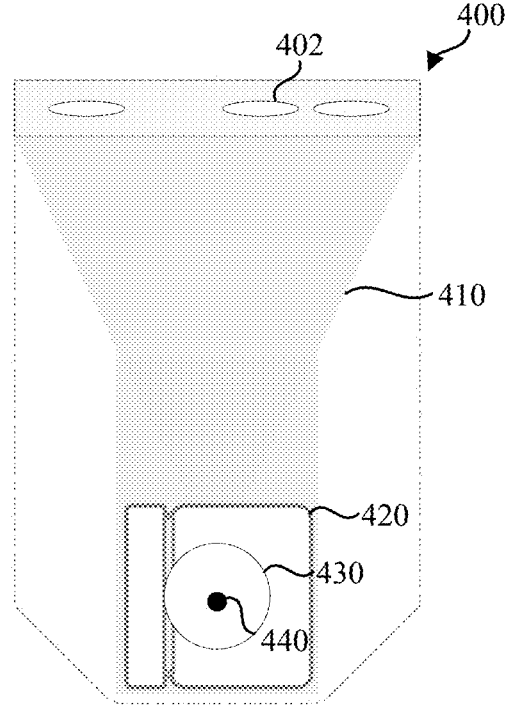
FIG. 4 is a schematic cross-sectional view of another illustrative variation of a container enclosure.

In some variations, the cavity (310) may be configured to receive and orient the container (320) within the container enclosure (300). For example, the cavity (310) may be configured to position the container (320) such that a longitudinal axis of the container (320) is parallel to a longitudinal axis of the container enclosure (300). Put another way, the cavity (310) may be configured to position the container (320) in an upright position within the container enclosure (300). In some variations, the cavity (310) may be configured to position the container (320) such that the longitudinal axis of the container (320) is about parallel to a longitudinal axis of the container enclosure (300). In some variations, the cavity (310) may be configured to position the container (320) such that a longitudinal axis of the container (320) is transverse) to a longitudinal axis of the container enclosure (300). For example, the cavity (310) may be configured to position the container (32) such that an angle formed between the longitudinal axis of the container (32) and the longitudinal axis of the container enclosure (300) is about 90 degrees, about 75 degrees, about 60 degrees, about 45 degrees, about 30 degrees, about 15 degrees, or about 10 degrees. In some of these variations, the container (320) may be positioned such that a longitudinal axis of the container (320) may be generally parallel to a width of the container enclosure (300). Moreover, the cavity (320) may be configured to laterally position the container (320) within the container enclosure (300). For example, in some variations, the cavity (320) may be positioned to laterally center the container (320) along a width of the container enclosure (300), as is depicted in FIGS. 3 and 4. In other variations, the cavity (320) may be configured to position the container (320) in a different location, such as along either of the edges of the container. It should be appreciated that the configuration of cavity (320) may vary depending on, for example, the size and/or shape of the container (320) and the position of other system components, such as the thermal source or temperature sensor.

As mentioned above, the container enclosure (300) may comprise an identifier (330), which may assist in identifying and tracking the biological substance and/or its container, and/or a temperature sensor (340), which may measure the temperature of the external surface of the container (320), and thus of the biological substance contained therein. In some variations, the identifier (330) may comprise data corresponding to one or more of the container enclosure (300), the container (320), and the biological substance as described in more detail herein. For example, the identifier (330) may comprise one or more of an RFID tag, label, barcode, QR code, and memory. Additionally or alternatively, the identifier (330) may be configured to store, receive, and/or transmit sensor data such as temperature measurements generated by one or more temperature sensors and/or authentication data. For example, the identifier (330) may receive a measured temperature (or set of measured temperatures) from the temperature sensor (340) during a temperature control process.

In some variations, one or more of the identifier (330) and the temperature sensor (340) may be positioned to overlap at least a portion of the container disposed in the container enclosure (300). For example, the identifier (330) and/or the temperature sensor (340) may be positioned to overlap about the entire width of the container. In some variations, the identifier (330) and/or the temperature sensor (340) may be positioned to overlap more than about 90 percent, more than about 80 percent, more than about 70 percent, more than about 60 percent, more than about 50 percent, more than about 40 percent, more than about 30 percent, more than about 20 percent, or more than about 10 percent of the width of the container (320), including all values and sub-ranges therein. In some variations, the identifier (330) and/or the temperature sensor (340) may be positioned to overlap about the entire length of the container (320). For example, the identifier (330) and/or the temperature sensor (340) may be positioned to overlap more than about 90 percent, more than about 80 percent, more than about 70 percent, more than about 60 percent, more than about 50 percent, more than about 40 percent, more than about 30 percent, more than about 20 percent, or more than about 10 percent of the length of the container (320). In variations comprising two or more temperature sensors and/or identifiers, each of the temperature sensors and/or identifiers may be positioned to overlap the container as described herein.

As mentioned above, the identifier (330) and/or the temperature sensor (340) may be positioned on the enclosure container (300) to overlie or overlap the portion of the cavity (310) configured to hold the container (320) during a thawing or cooling process, such that when the container (320) is inserted into the cavity (310), the identifier (330) and/or the temperature sensor (340) directly contacts and/or directly overlies the container (320). For example, the identifier (330) and/or temperature sensor (340) may be located at a second portion of the cavity (310) (e.g., bottom portion of the container enclosure) opposed to a first portion of the cavity (310) (e.g., top portion or funnel portion of the container enclosure, adjacent to the opening of the container enclosure (300)). Furthermore, the identifier (330) and/or temperature sensor (340) may be located at a portion configured to overlie or overlap a center of a container (320) disposed within the cavity (310). This may improve temperature measurement of the container (320) and biological substance, as well as simplify manufacture of the container enclosure (300). In some variations, two or more identifiers (330) and/or temperature sensors (340) (e.g., two, three, four, five, six, seven, eight or more) may be positioned on the enclosure (300) to overlie or overlap the portion of the cavity (310) configured to hold the container (320) during a temperature control process (e.g., thawing or cooling process).

In some variations, the temperature sensor (340) may comprise one or more of a contact temperature sensor and a non-contact temperature sensor. In some variations, a contact temperature sensor may be integrated with, or secured to, the container enclosure (300) to measure the temperature of the biological substance through the container (320). For example, a contact temperature sensor may be positioned on an inner surface (e.g., cavity surface) of the container enclosure (300) to contact the container (320), or on an outer surface of the container enclosure (300). In the latter variation, the temperature of the container (320) may be measured through a wall of the container enclosure (320). In some variations, a non-contact temperature sensor may be configured to measure electromagnetic radiation emitted from the biological substance (e.g., infrared radiation). Additionally, in some variations, the container enclosure (300) may comprise a contact temperature sensor positioned on an outer surface of the container enclosure (300) to contact a thermal interface or thermal source of device (200). In these variations, the contact temperature sensor may measure a temperature of the thermal interface or thermal source, which may be useful in controlling or otherwise informing a temperature control process. In some variations, one or more temperature sensors (contact and non-contact) may be configured to communicate with a controller (104) via communication links that are wired and/or wireless.

In some variations, the identifier (330) and the temperature sensor (340) may be coupled to or integrated with one another. For example, in a variation in which the identifier (330) comprises a radiofrequency identification (RFID) tag, the temperature sensor (340) may be integrated with the RFID tag, and the integrated device may be mounted to a surface (e.g., inner surface, outer surface, cavity surface) of the container enclosure (300). Mounting may include being printed on a surface, adhered to a surface by an adhesive, and the like. The RFID tag may be configured to wirelessly transmit data (e.g., temperature measurements, authentication data) to a reader in communication with the controller. In some variations, the temperature sensor may be a sensor of a smart label, as discussed in International Patent Application No. WO 2016/023034, filed Aug. 10, 2015, entitled "Smart Bag Used In Sensing Physiological And/Or Physical Parameters Of Bags Containing Biological Substance," the entirety of which is hereby incorporated by reference.

FIG. 3 further illustrates the container (320) comprising a biological substance (not shown) received within the cavity (310) of the container enclosure (300). The container (320) may be any container suitable for transporting small volumes of biological substances, such as, for example, a vial or a cuvette. In some variations, the volume of the container and/or a predetermined volume of the biological substance within the container may be between about 0.5 mL and about 1 mL, between about 1 mL and about 3 mL, between about 3 mL and about 5 mL, between about 5 mL and about 10 mL, between about 10 mL and about 20 mL, between about 20 mL and about 50 mL, between about 50 mL and about 100 mL, between about 100 mL and about 250 mL, between about 250 mL and about 500 mL, including all ranges and sub-values in-between.

In some variations, the biological substance may comprise one or more of a vaccine (e.g., an mRNA vaccine, a DNA vaccine), exosome, liquid biopsy, blood, cryo-preserved tissue, therapeutic, prophylactic, cell therapy product such as stem cells and T-cells, combinations thereof, and the like. In some variations, the container and biological substance may be transported and/or stored at a temperature of as low as about −80° C. (between about 0° C. and about −80° C.). The biological substance may be then be thawed from this temperature to a predetermined temperature such as room temperature.

In some variations, the container enclosure (300) may comprise a thermally conductive material configured to transfer thermal energy to and from the biological substance. Additionally, the container enclosure (300) may be configured to withstand temperatures within a predetermined temperature range (e.g., between about −196° C. to about 40° C.). In some variations, the container enclosure (300) may comprise one or more layers of thermally conductive material. For example, the container enclosure (300) may comprise a plurality of layers bonded together. Each of the plurality of layers may be the same material, or a different material, of each of the remaining plurality of layers. Additionally or alternatively, the plurality of layers may comprise one or more separate (e.g., non-bonded) layers. In some variations, the container enclosure (300) may be composed of a compliant material to allow the container enclosure to generally conform to a shape of the container disposed therein. In some variations, the container enclosure may comprise one or more of a rigid portion, semi-rigid portion, and compliant (e.g., soft) portion. For example, the welds may form a rigid portion, an opening of the container enclosure (300) may comprise the semi-rigid portion, and the cavity (310) of the enclosure (300) may correspond to the compliant portion. In some variations, the container enclosure (300) may be configured to provide anti-microbial properties, whether intrinsically or through the use of coatings or additives.

In some variations, one or more portions of the container enclosure (300) may comprise an insulator coupled to one or more of the identifier (330) and the temperature sensor (340). For example, the container enclosure (300) may comprise an encapsulated air pocket (not shown) or an insulating material (e.g., a material having a low thermal conductivity) that may insulate the identifier (330) and/or the temperature sensor (340), thus promoting thermal isolation of the identifier (330) and/or temperature sensor (340) from the environment external to the container enclosure (300). In further variations, the container enclosure (300) may comprise a portion made of an insulating material, and the identifier (330) and/or the temperature sensor (340) may be coupled to this portion of the container enclosure (300).

The container enclosures described herein may have dimensions configured to receive containers having various shapes and sizes. For example, FIG. 4 is a schematic cross-sectional view of another illustrative variation of a container enclosure (400) similar to container enclosure (300) such that the detailed description of corresponding elements such as a coupling mechanism (402), a cavity (410), an identifier (430), and a temperature sensor (440) is omitted for the sake of brevity. The container enclosure (400) may be configured to receive a container (420) having a biological substance where the container (420) is larger than the container (320) shown in FIG. 3. The container enclosure (400) may also be received within a chamber of a temperature control device (e.g., device (200)) to regulate the temperature of the biological substance within the container (420) contained therein.

Relative to the container enclosure (300) of FIG. 3, the container enclosure (400) of FIG. 4 has a wider cavity in order to accommodate a container (420) having a larger width. For example, the cavity (410) of the container enclosure (400) may be configured to receive a rectangular-prism-shaped container (420). In some variations, the cavity (410) may comprise a shape configured to funnel the container (420) to a predetermined position and location within the enclosure (400). For example, as shown in FIG. 4, the cavity (410) may comprise a funnel shape that enables an operator to easily place the container (420) into the enclosure (400), and for the shape of the cavity (410) to guide the container (420) into a predetermined position and orientation (e.g., at a bottom-center portion of the enclosure (400)). The funnel shape may, for example, extend across the entire width of the container enclosure (400) at its widest point. In some variations, the container enclosures described herein may be in the form of an overwrap bag as discussed in previously mentioned International Patent Application No. WO 2016/023034, which is incorporated by reference herein in its entirety.

The container enclosures described herein may have dimensions configured to receive containers having various shapes and sizes. For example, FIG. 14A is a schematic cross-sectional view of another illustrative variation of a container enclosure (1400) similar to container enclosures (300, 400) such that the detailed description of corresponding elements such as a coupling mechanism (1402), a cavity (1410), an identifier (1430), and a temperature sensor (1440) is omitted for the sake of brevity. The container enclosure (1400) may be configured to receive a container (1420) having a biological substance where the container (1420) is positioned within a holder or adapter (1450). The container enclosure (1400) may also be received within a chamber of a temperature control device (e.g., device (200)) to regulate the temperature of the biological substance within the container (1420) contained therein.

As shown in FIG. 14A, the cavity (1410) may comprise a holder or adapter (1450) that enables an operator to easily place the container (1420), which may be a small volume container, into the enclosure (1400), which may be much larger than the container (1420). The adapter (1450) may be configured to hold the container (1420) in a predetermined position and at a predetermined location within the enclosure (1400) (e.g., in an upright position and/or in alignment with the temperature sensor (1440) and/or identifier (1430)) and may be configured to transfer heat generated by the system (100) to the biological substance. In some variations, the adapter (1450) may be configured to hold the container at a bottom-center portion of the container enclosure (1400). In some variations, the adapter (1450) may extend across the entire width of the container enclosure (1400), or across substantial portion of the width of the container enclosure (1400), such as, for example, across about 60%, about 70%, about 75%, about 80%, about 85%, and about 90%, including all values and sub-ranges therein.

The adapter (1450) may be sized to receive the dimensions of the container (1420). For example, the adapter (1450) may comprise a cavity, lumen, hole, aperture, or other opening that may be configured to receive a container (1420). In some instances, the adapter (1450) may be configured to hold the container (1420) such that a longitudinal axis of the adapter (1450) may be parallel to or about parallel to a longitudinal axis of the container (1420). The adapter may have a length between about 25 mm and about 50 mm, including all values and sub-ranges therein. For example, the adapter may have a length between about 28 mm and about 48 mm, between about 30 mm and about 45 mm, or between about 35 mm and about 40 mm. For instance, the adapter may have a length of about 30 mm, about 35 mm, about 40 mm, about 45 mm, or about 55 mm. In some variations, a length of the adapter may be greater than or equal to a length of the container. In some variations, a ratio of the length of the adapter to the length of the container may be between about 1:1 to about 2:1, including all values and sub-ranges therein. For instance, a ratio of the length of the adapter to the length of the container may be between about 12:10 and about 18:10, between about 13:10 and about 17:10, or between about 14:10 and about 16:10.

As depicted in FIG. 14A, the cross-sectional view of the adapter (1450) parallel to the Z-X plane may comprise a U-shaped cross-sectional shape where a bottom portion of the container (1420) is held by the bottom of the adapter (1450), and the sidewalls of the container (1420) are in contact with the sides of the adapter (1450) and the sidewalls of the container enclosure (1400). While the portions (e.g., sidewalls, bottom) of the U-shaped adapter are depicted as having a rectangular cross-sectional shape, it should be appreciated that the portions may have other cross-sectional shapes, such as, for example, trapezoidal or square, and/or may have curved surfaces, such as for example, concave or convex internal (container-facing) or external (enclosure-facing) surfaces (e.g., concave or convex bottom surface, concave or convex sidewall surfaces). In some variations, the adaptor may conform to the shape of the container (1420).

The adapter (1450) may comprise any shape suitable to hold the container (1420) in a desired, predetermined position (e.g., in an upright position and aligned with a temperature sensor and/or identifier) and may be, for example, cylindrical, rectangularly, frustoconical, pyramidal, a triangular prism, or the like. For example, in variations in which the adapter (1450) may be cylindrical in shape, the cross-sectional view of the adapter parallel to the X-Y plane may be circular. In some variations, the adapter (1450) may have one or more openings and/or slots (e.g., two) that allow contact between the container and a thermal source through the container enclosure.

In some variations, the adapter (1450) may be composed of a thermally conductive material and may be configured to receive the container with an interference fit. Put differently, in some variations, the container (1420) may be positioned within the adapter (1450) by exerting force on the container (1420) and/or on the adapter (1450) such that the container (1420) tightly fits within the adapter (1450). An amount of interference (e.g., a difference between a width of the container (1420) and the width of the cavity, lumen, hole, aperture, or other opening of the adapter (1450)) may indicate the tightness of the fit between the container (1420) and the adapter (1450). In some variations, the amount of interference (e.g., allowance) may be between about 0.12 mm and about 0.4 mm, including all values and sub-ranges therein. For example, the allowance may be between about 0.15 mm and about 0.35 mm, between about 0.2 mm and about 0.3 mm, between about 0.22 mm and about 0.28 mm, or between about 0.24 mm and about 0.26 mm.

In some variations, the adapter (1450) may be composed of a compliant material to allow the container enclosure to generally conform to a shape of the container disposed therein. In some variations, the adapter (1450) may be composed of one or more of an open cell material, a closed cell material, a porous material, a compressible material, a compliant material, an absorbent material, a semi-rigid material, and a rigid material. For example, an adapter (1450) comprising an absorbent material may be configured to absorb a spilled biological substance (e.g., from a broken or cracked container (1420)). In some variations, at least a portion of the adapter may comprise a sponge. In some variations, the adapter (1450) may be formed from a reversibly deformable material. For example, the adapter (1450) may include a covering/body that may be filled with a fluid. Some non-limiting examples of suitable fluids may include water, gel, synthetic oils, non-synthetic oils, other heat-absorbing materials, or any combination thereof. The covering may be composed of a compliant material so that the adapter conforms to a shape of the container disposed therein. In some variations, the adapter (1450) may be configured to have anti-microbial properties, whether intrinsically or through the use of coatings or additives. In some variations, the adapter (1450) may be configured to be sterilized. Additionally or alternatively, the adapter (1450) may be pretreated to ensure no contamination to air surrounding the container (1420).

The adapter (1450) may be configured to be insertable and removable from the container enclosure or fixedly coupled to the container enclosure. For example, the adapter (1450) may be configured to be insertable and removable from the container enclosure (1400) so as to be disposable (e.g., a limited use component) after a specific number of uses. For example, the adapter (1450) may be removed from the container enclosure (1400) and replaced. In these variations, the adapter (1450) may be coupled to the container enclosure (1400) by virtue of being received within the container enclosure, but may not be otherwise attached to the container enclosure (1400). In other variations, the adapter (1450) may be fixed to the container enclosure (1400), using, for example, adhesive, mechanical connectors, or the like, and may not be configured to be easily removed from the container enclosure (1400). In yet other variations, the adapter (1450) may be freely placed within the container enclosure (1400) and may be releasably fixedly coupled to the container enclosure (1400) for use during thawing using any suitable coupler (e.g., mechanical coupling, friction fit coupling, magnetic coupling, and/or the like). For example, the container enclosure (1400) may have a recessed portion at the inner surface of the bottom portion of the container enclosure (1400). The adapter (1450) may have a protrusion at the bottom surface of the bottom portion of the adapter (1450) that may be configured to fit into the recessed portion of the container enclosure (1400), thereby coupling the adapter (1450) to the container enclosure (1400). After one or more uses, the container enclosure (1400) be may be configured to release the adaptor (1450) such that the adapter may then be easily removed from the container enclosure (1400). In some variations, the adapter (1450) may be replaced with a different adapter (1450) after predetermined time and/or after predetermined number of usages. In variations in which the adapter (1450) may be removable from the container enclosure (1400), the adapter (1450) may be coupled to the container enclosure (1400) via a suitable In variations in which the adapter is removable from the container enclosure, the adapter may be configured to be removed from the container enclosure and disposed of after at least one use, after at least two uses, after at least three uses, after at least four uses, after at least five uses, after at least six uses, after at least seven uses, after at least eight uses, after at least nine uses, after at least ten uses, or more.

In some variations, the adapter (1450) may be configured to overlap at least a portion of the container (1420). For example, the adapter (1450) may be configured to cover or overlap a predetermined area (e.g., sidewall) of the container (1420) (e.g., about 100%, about 90%, about 80%, about 70%, about 60%, about 50%, about 40%, about 30% or about 20%.). For example, the adapter (1450) may cover a bottom portion and a sidewall portion of the container (1420) while leaving a top portion of the container (1420) uncovered. For instance, the adapter (1450) may cover the bottom portion, the sidewall portion, and if applicable depending on the configuration of the container (1420), the neck and/or lip portion, of the container (1420) while leaving just the orifice or a lid (e.g., the top portion) of the container (1420) uncovered. Additionally or alternatively, the adapter (1450) may cover the bottom portion and the sidewall of the container (1420) while leaving a neck and/or lip (e.g., including an orifice and lid portion) of the container (1420) uncovered. As another example, the adapter (1450) may cover a sidewall portion of the container (1420) while leaving both a lid of the container (1450) and a bottom portion of the container (1450) uncovered. In such variations, at least a part of the bottom portion of the container (1450) may be in direct contact with the container enclosure. As yet another example, the adapter (1450) may cover the bottom portion of the container (1450) and a sidewall portion and the lid portion of the container (1450) such that a height of the adapter (1450) may be greater than the height of the container (1450). In some variations, the adapter (1450) may have a height corresponding to about a third, two-thirds, equal to, or greater than a height of the container (1420). In some variations, this may enable the adapter (1450) to hold the container (1420) in a predetermined position and location without wholly covering the container (1420).

Additionally or alternatively, the cavity (1410) of the enclosure (1400) may comprise a funnel shape similar to that of cavity (310, 410) described herein to funnel the adapter (1450) and the container (1420) to a predetermined position and location within the enclosure (1400) (e.g., within a cavity of the holder (1450)), and/or to hold the adapter (1450) and the container (1420) in the predetermined location and position.

In some variations, the identifier (1430) and/or the temperature sensor (1440) may be coupled to the enclosure and may be positioned to overlap at least a portion of the container (1420) as described above with respect to FIG. 3. Additionally or alternatively, the identifier (1430) and/or the temperature sensor (1440) may be mounted on, carried by, or otherwise coupled to the adapter (1450). For example, FIG. 14B is a schematic cross-sectional view of another illustrative variation of a container enclosure (1400) similar to container enclosure (1400) in FIG. 14A such that the detailed description of corresponding elements such as a coupling mechanism (1402), a cavity (1410), an identifier (1430), and a temperature sensor (1440) is omitted for the sake of brevity. However, in FIG. 14B, the identifier (1430) and/or the temperature sensor (1440) may be carried by of the adapter (1450) itself (i.e., the adapter may comprise the identifier and/or the temperature sensor). For example, the identifier (1430) and/or the temperature sensor (1440) may be positioned on the adapter (1450) such that the temperature sensor (1440) contacts or is otherwise in thermal communication with the container (1430). For example, the identifier (1430) and/or the temperature sensor (1440) may be on an internal (e.g., container-facing) surface of the adapter (1450). For instance, as depicted in FIG. 14B, the identifier (1430) and/or the temperature sensor (1440) may be positioned on a sidewall of the adapter (1450) such that the temperature sensor (1440) and/or the identifier (1430) are facing the container (1420). The identifier (1430) and/or the temperature sensor (1440) may be positioned on any container-facing surface, such as, for example, on either sidewall and/or the bottom portion of the adapter (1450) such that the identifier (1430) and/or the temperature sensor (1440) are container-facing. In some variations, the identifier (1430) and/or the temperature sensor (1440) may be positioned to overlap at least a portion of the adapter (1450).

Although FIGS. 14A and 14B illustrate a single identifier (1430) and a single temperature sensor (1440) positioned to overlap the container (1420) and/or the adapter (1450), it should be readily understood that any suitable number of identifiers and/or temperature sensors (e.g., two, three, four, five, six, seven, eight or more) may be positioned to overlap with a container and/or an adapter. In some variations, a plurality of temperature sensors and/or identifiers may be used in order to provide additional information about biological substances contained within a container during a thawing process. In these variations, one or more temperature sensors and/or identifiers may be positioned to provide information about a first portion of the container and one or more temperature sensors may be positioned to provide information about a second, different portion of the container. Use of a plurality of temperature sensors can assist in assuring uniform thawing. For example, a first identifier and a first temperature sensor may be positioned to overlap with a first portion or side of the container (1420) while a second identifier and a second temperature sensor may be positioned to overlap with a second portion or side of the container (1420) (e.g., a side opposite the first side of the container (1420)). In variations in which more than one temperature sensor and/or identifier are configured to overlap with the container (1420) and/or the adapter (1450), the adapter (1450) may be configured to hold the container (1420) in alignment with one or more of the temperature sensors and/or identifiers, including all of the temperature sensors and/or identifiers or a sub-set of the temperature sensors and/or identifiers. For example, if the container enclosure comprises three temperature sensors and/or identifiers, the adapter (1450) may be configured to hold the container (1420) in alignment with each of the three temperature sensors.

In some variations, a plurality of temperature sensors and/or identifiers may be used to on a single container enclosure to allow for use of that container enclosure with different adapters and/or containers having different sizes and shapes. In these variations, different sets of temperature sensors and/or identifiers may be used depending on which container and/or biological substance is selected for a thawing process. For example, the container enclosure may comprise five temperature sensors and/or identifiers, and a portion of the temperature sensors and/or identifiers may be intended for use with a first container having a first size and a first shape, a different portion of the temperature sensors and/or identifiers may be intended for use with a second container having a different size and/or different shape. In this variation, a first adapter may be configured to hold the first container in alignment with a first set of the temperature sensors and/or identifiers (e.g., sensors and/or identifiers 1, 2, 3, and 4) and the same, or a different adapter, may be configured to hold the second container in alignment with a second, different set of the temperature sensors and/or identifiers (e.g., sensors and/or identifiers 1, 2, 3, and 5). While described above in relation a container enclosure, it should be appreciated that any of the temperature sensor(s) and/or identifier(s) may be provided on the adapter instead of, or in addition to, those on the container enclosure.

In variations in which the temperature sensor (1440) is positioned to overlap with the container (1420) and/or the adapter (1450), the temperature sensor (1440) may be positioned on an inward facing surface of the container enclosure (1400) and/or a container-facing surface of an adapter. Opposing the temperature sensor (1440) may be an insulator. For instance, an insulator may be on an exterior surface of the container enclosure (1400) opposing the temperature sensor. Similarly, an insulator may be positioned between the adapter and the temperature sensor and/or on a surface of the adapter facing away from the container opposing the temperature sensor (1440). In some variations, the insulator may be an air pocket or any suitable insulative material. The insulator may promote thermal isolation of the temperature sensor (1440) from an environment outside of the container enclosure (1400), outside of the adapter (1450), and/or from the adapter (1450).

FIGS. 5-11 depict additional variations of a container enclosure for use with a temperature control device and as part of a temperature control system as described herein. In these variations, the container enclosure may comprise the components forming a thermal interface between a container having a biological substance and a thermal source of a temperature control device. The container enclosure may be releasably coupled to the container and the thermal source, and may further provide temperature monitoring, identification, and tracking of the biological substance. FIGS. 5-11 depict container enclosure variations as well as associated containers and temperature control devices. The systems and components depicted in FIGS. 5-11 may be compact and particularly useful in controlling a temperature of a low volume biological substance such as a vaccine. FIG. 5A is a schematic side view of an illustrative variation of a container (500) (e.g., a low volume container) comprising a biological substance as described herein. The container (500) may have any shape or size suitable for transporting, storing, heating, and/or cooling of a biological substance, and particularly, small volumes of a biological substance. For example, the container (500) may comprise a circular, square, or rectangular cross-sectional shape and may be configured to receive between about 1 mL and about 100 mL of a biological substance. In some variations, the container (500) may be a vial or a cuvette.

In some variations, the container enclosure may comprise an adapter configured to receive the container, which may function as a thermal interface between the biological substance and a thermal source to facilitate heat transfer. The adapter may further aid engagement and alignment with other portions of the container enclosure, such as a conductive housing comprising a thermal conductor. In some variations, the adapter may be configured to directly contact a thermal source or indirectly contact the thermal source via the thermal conductor.

Figure 5A:
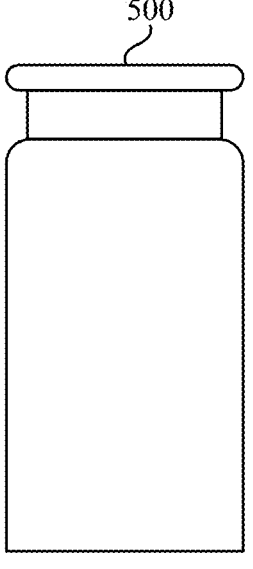
FIG. 5A is a schematic side view of an illustrative variation of a container.
Figure 5B:
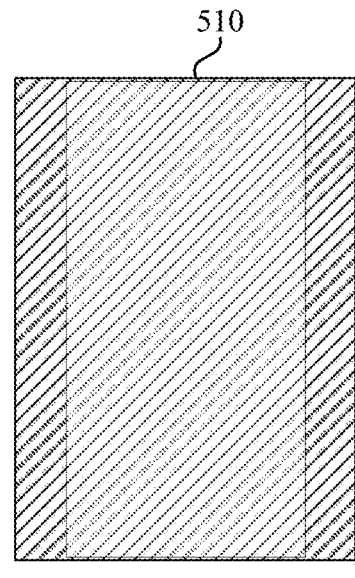
FIG. 5B is a schematic cross-sectional side view of an illustrative variation of an adapter.
Figure 5C:
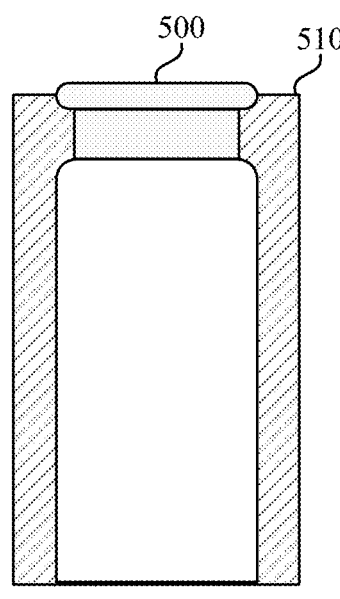
FIG. 5C is a schematic cross-sectional side view of the container shown in FIG. 5A received within the adapter shown in FIG. 5B.
Figure 5D:
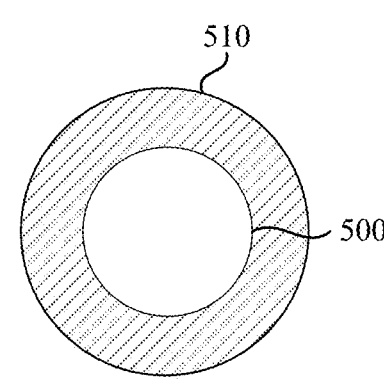
FIG. 5D is a schematic plan view of the container and adapter shown in FIG. 5C.

FIG. 5B is a schematic cross-sectional side view of an illustrative variation of an adapter (510) having a cavity configured to receive the container (500). The adapter (510) may be configured to receive the container (500) such that the adapter may cover a sidewall portion of the container (500) and, if present, a neck/lip of the container, leaving the top portion (e.g., orifice, lid) of the container (500) uncovered. The adapter (510) may have a shape and size corresponding to the container (500). For example, in variations in which a cylindrical container (500) is employed, the adapter (510) may also have a cylindrical shape, whereas in variations in which a container with a rectangular cross-sectional shape is employed, the adapter (510) may have a rectangular cross-sectional shape. In some variations, the adapter may be in the form of a sleeve with open ends, closed ends, or a combination thereof (i.e., one open end and one closed end). FIG. 5C is a schematic cross-sectional side view of the container (500) received within the cavity of the adapter (510) and FIG. 5D is a schematic plan view of the container (500) and the adapter (510).

Figure 11A:
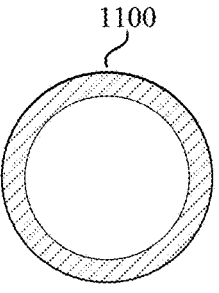
FIG. 11A is a schematic plan view of an illustrative variation of an adapter of a container enclosure.
Figure 11B:
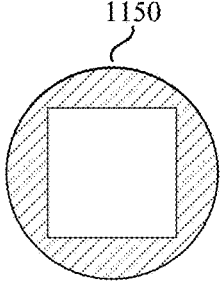
FIG. 11B is a schematic plan view of another illustrative variation of an adapter of a container enclosure.

FIGS. 11A and 11B are schematic plan views of an illustrative variations of an adapter (1100, 1150) configured to enable the container to thermally interface with a temperature control device. In some variations, the adapter may be composed of a thermally conductive, rigid material configured to receive the container with an interference fit. Additionally or alternatively, the adapter (1100, 1150), or a portion thereof (e.g., internal surface) may be configured to conform to a shape of the container, which may be, for example, cylindrical and/or rectangular. The adapter may comprise one or more of a metal (e.g., aluminum, copper thread), ceramic, polymer, and silicone. In some variations, the adapter may be transparent to aid visual identification of the container.

In some variations, the adapter may comprise a plurality of sleeves configured to be nested together. The adapter may have any inner and outer dimensions suitable to receive a container and to releasably couple to a conductive housing and/or a temperature control device. For example, a set of adapters may have different dimensions (e.g., inner diameter, shape) to accommodate containers of different dimensions, but have consistent outer diameters in order to fit properly into the conductive housing and/or the temperature control device. In some variations, the adapter may comprise a thickness between about 0.5 mm and about 2 mm.

Figures 6A, 6B, 6C, 6D:
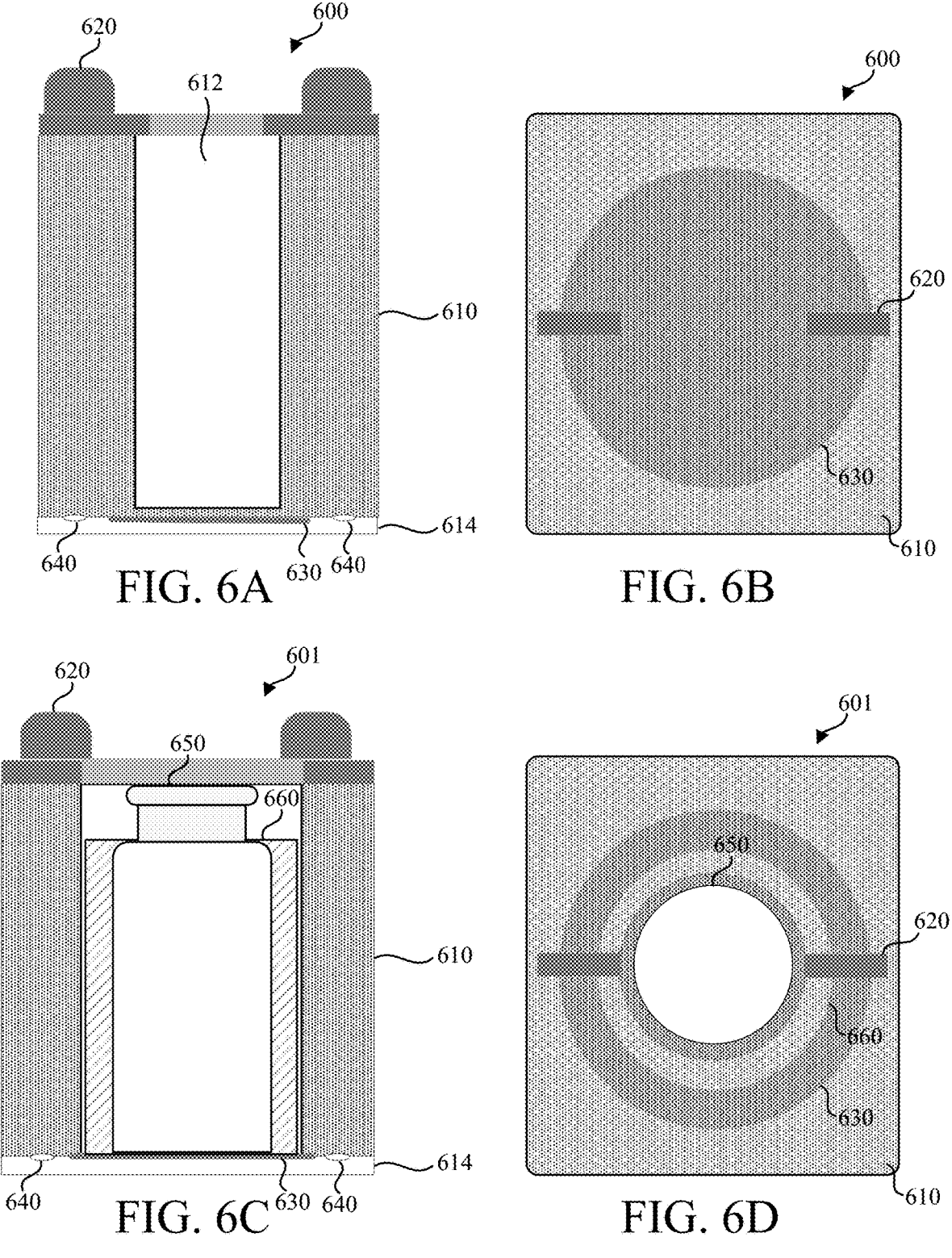
FIG. 6A is a schematic cross-sectional side view of an illustrative variation of a conductive housing of one variation of a container enclosure.
FIG. 6B is a schematic plan view of the conductive housing shown in FIG. 6A.
FIG. 6C is a schematic cross-sectional side view of an illustrative variation of the container enclosure and a container disposed therein.
FIG. 6D is a schematic plan view of the container enclosure and the container shown in FIG. 6C.

In some variations, the container enclosure may comprise a conductive housing configured to receive the adapter. In these variations, the conductive housing may further serve as a thermal interface between the thermal source and a biological substance. The use of a conductive housing may allow the container received within the container enclosure to be handled more easily as compared to conventional water heating methods. FIG. 6A is a schematic cross-sectional side view of an illustrative variation a conductive housing (600) of a container enclosure. FIG. 6B is a schematic plan view of a container enclosure (601) (e.g., assembly) including the conductive housing (600) shown in FIG. 6A. As shown there, the conductive housing (600) may comprise a support (614), a thermal conductor (610), a handle (620), an identifier (630), and a temperature sensor (640) (e.g., thermistor) configured to measure the temperature of the biological substance. The conductive housing (600) may further comprise a cavity (612), which may be formed by the support (614) and the thermal conductor (610). The cavity (612) may be configured to receive an adapter (660) and a container (650). In some variations, the conductive housing (600) may be releasably coupled to both the adapter and the thermal source. FIG. 6A depicts the conductive housing (600) of the container enclosure (601) separated from the adapter (660), container (650), and temperature control device. The adapter (660) may be configured to receive the container (650) such that the adapter (660) covers at least a portion of the sidewall portion of the container (650) leaving a lip, a neck, an orifice, and/or a lid of the container (650) uncovered. The handle (620) may enable the container enclosure (601) to be manipulated by an operator so as to be inserted/removed into a chamber of a temperature control device. In some variations, the thermal conductor (610) may function as a thermal interface between a thermal source and the biological substance (e.g., via the adapter (660) and container (650)). In some variations, the thermal conductor (610) and the adapter (660) may each comprise a thermally conductive material such as one or more of a metal, ceramic, polymer, and silicone. In some variations, the handle (620) may comprise a set of tabs (e.g., protrusions, grips, ears) for grasping.

In some variations, the conductive housing (600) may comprise a temperature sensor and/or an identifier. For example, in some variations, the support (614) may comprise a temperature sensor (640) as described in more detail herein. The temperature sensor (640) may be any temperature sensor suitable for measuring the temperature of the biological substance within a temperature control device, such as, for example, a thermocouple. Additionally or alternatively, the support (614) may comprise the identifier (630) as described in more detail herein. In some variations, one or more of the identifier (630) and the temperature sensor (640) may be configured to contact the adapter (660) and/or the container (650) directly. While described above as part of or coupled to the support (614), one or more of the identifier and the temperature sensor may be disposed on any portion of the conductive housing (e.g., sidewall, top side, bottom side). For example, the temperature sensor may be a non-contact temperature sensor disposed within the thermal conductor (610) and/or on an outer surface of the conductive housing (600).

FIG. 6C is a schematic cross-sectional side view of an illustrative variation of a container enclosure (601) with a container (650) disposed therein. As depicted there, the container enclosure (601) may comprise the conductive housing (600) and the adapter (660), and the adapter (660) may be received within the cavity (612) of the conductive housing (600). FIG. 6D is a schematic plan view of the container enclosure (601) and the container (650). The adapter (660) may have dimensions suitable for an interference fit with the thermal conductor (610). The container (650) may be received within or otherwise releasably coupled to the adapter (660), and the adapter (660) may be received within or otherwise releasably coupled to the conductive housing (600) in a similar manner as discussed with respect to the container and adapter in FIGS. 5A-5D. In some variations, the container enclosure (601) may be configured for limited use (e.g., single use). For example, in some variations, one or both of the adapter (660) and the conductive housing (600), or portions thereof (e.g., thermal conductor (610)) may be configured for limited use and may thus be disposable.

Figure 7A:
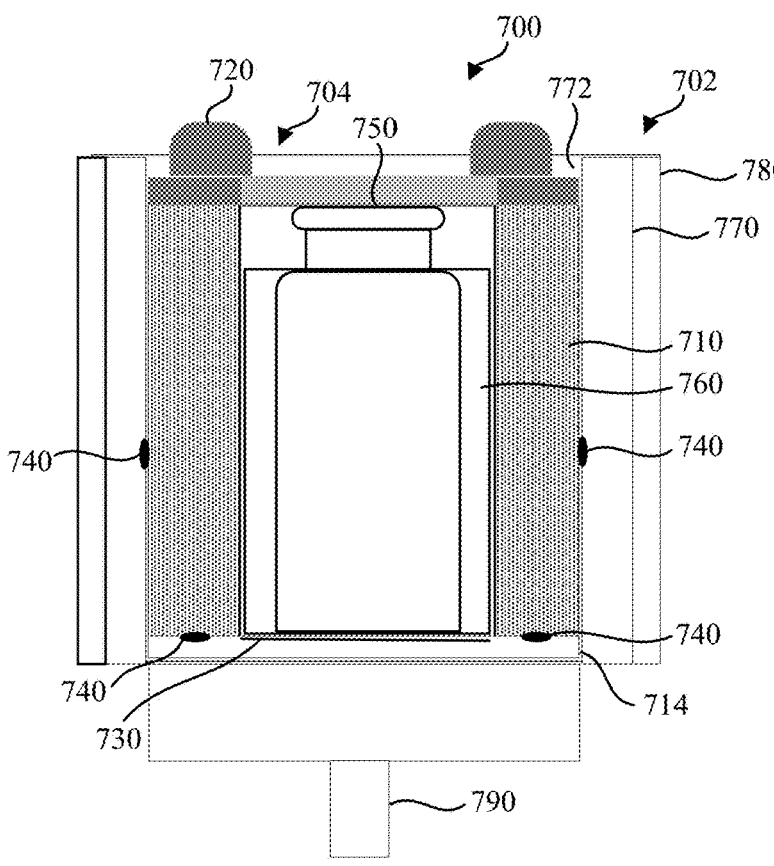
FIG. 7A is a schematic cross-sectional side view of an illustrative variation of a temperature control system configured to control a temperature of a biological substance.
Figure 7B:
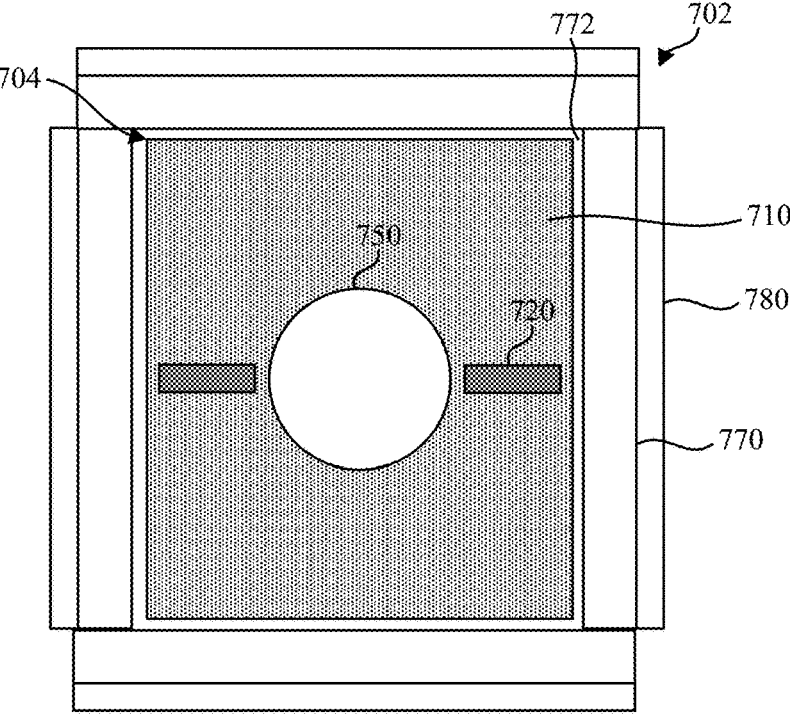
FIG. 7B is a schematic plan view of the system shown in FIG. 7A.

The container enclosure (601) may be used with a temperature control device to regulate the temperature of a biological substance inside. For example, the container enclosure (601) comprising the conductive housing (600) and adapter (660) may be received within or otherwise releasably coupled to a temperature control device comprising a thermal source to control a temperature of a biological substance. FIG. 7A is a schematic cross-sectional side view of an illustrative variation of a temperature control system (700) comprising a temperature control device (702) configured to control a temperature of a biological substance received within the container enclosure (601). FIG. 7B is a schematic plan view of the temperature control device (702). The temperature control system (700) may comprise a temperature control device (702) comprising a thermal source (780), sidewalls (770), and an agitator (790), and a container enclosure comprising an adapter (760) and a conductive housing (704). The conductive housing (704) may comprise a thermal conductor (710), a support (714), a handle (720), an identifier (730), and a temperature sensor (740). The container (750) may be received within the adapter (760) of the container enclosure, and the container enclosure may be received within a chamber (772) formed between the sidewalls (770). For example, the conductive housing (704) receiving (e.g. holding) the adapter (760) and the container (750) may be configured to be received in the chamber (772) of the temperature control device (702), which is formed between the sidewalls (770). In this manner, the thermal source (780) may be releasably coupled to, and in thermal communication with, the conductive housing (704). In this way, the temperature control device (702) may control the temperature of the biological substance in the container (750).

The thermal source (780) may comprise a heater, a cooler, and a combination of thereof. For example, in some variations, the thermal source (780) may comprise a Peltier element. In these variations, the Peltier element may be configured to regulate the temperature of the biological substance by generating heat and/or by cooling as desired. In some variations, the temperature control device (702) may comprise a plurality of thermal sources (780) such that thermal sources (780) are positioned on several sides of the container enclosure and/or the thermal source (780) may be configured to surround the container enclosure, as shown in FIG. 7B.

As mentioned above, the temperature control system (700) may comprise one or more (e.g., a plurality, two, three, four, five or more) temperature sensors. One or more temperature sensors (740) may be positioned on one or more sidewalls (770) and disposed between the sidewall (770) and a thermal conductor (710) of the conductive housing (704) (e.g., on an internal surface of the sidewall (770), on the support (714), on any portion of the conductive housing (704), and/or on the adapter (714). For example, one or more temperature sensors (740) may be disposed on an upper outer surface of the support (714) and configured to contact a container (750).

In some variations, one or more components of the container enclosure (e.g., conductive housing (704) and adapter (760)) may be configured for single use, while the temperature control device (702) may be configured to be reusable. For example, in some variations, the conductive housing (704) and/or the adapter (760) of the container enclosure may be configured for single or limited use (e.g., between 1 and 5 uses), while one or more of the sidewalls (770), the thermal source (780), and the agitator (790) of the temperature control device (702) may comprise reusable (e.g., durable) components. This may be useful where the conductive housing (704) is releasably coupled to the agitator (790).

As mentioned above, the temperature control device (702) may optionally comprise an agitator (790). The agitator (790) may be configured to agitate the container enclosure. More specifically, the agitator (790) may be configured to agitate the adapter (760) holding the container (750) and thus the biological substance contained therein, and in some variations, the thermal conductor (710) of the conductive housing, during a temperature regulation process (e.g., heating). In some variations, the agitator (790) may comprise a motor and cam (not shown) configured to generate a pivoting motion, a motor configured to generate longitudinal motion, and/or a motor configured to generate vibrational motion. The frequency and magnitude at which an agitator applies force to the container enclosure may be controlled by the controller (e.g., controller 104). For example, the agitator (790) may be configured to operate at about 0.5 Hz. In some variations, the agitator (790) may be configured to raise a height of the container (750) and housing (714) which may aid insertion and removal of the housing (714) from the temperature control device (702). However, in some variations, the system (700) may not comprise an agitator (790), or the agitator (790) may be turned off or otherwise deactivated such that agitation is inhibited.

Figures 8A, 8B, 8C:
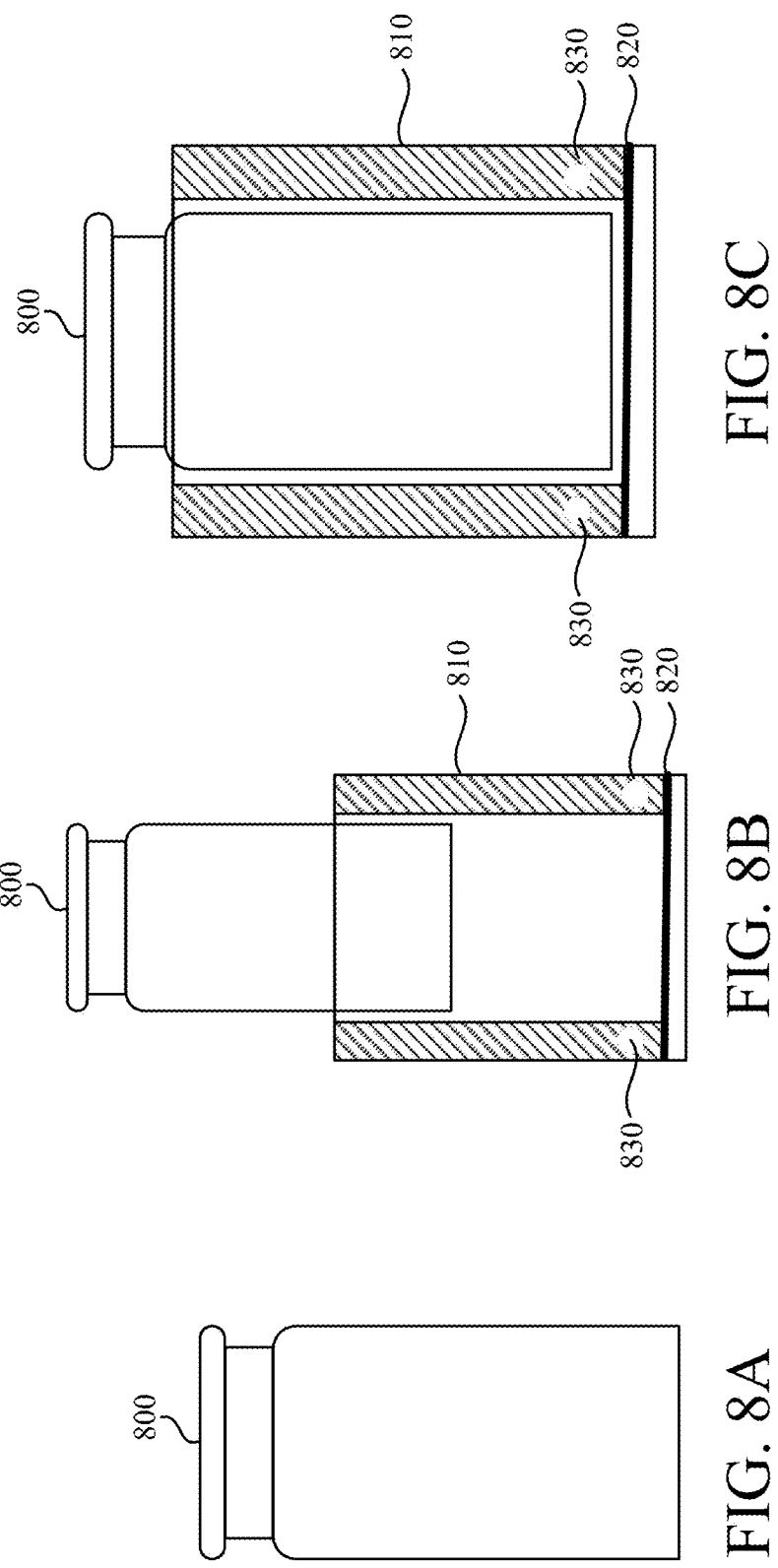
FIG. 8A is a schematic side view of another illustrative variation of a container.
FIG. 8B is a schematic cross-sectional side view of an illustrative variation of the container shown in FIG. 8A partially received within another variation of a container enclosure.
FIG. 8C is a schematic cross-sectional side view of the container shown in FIG. 8A fully received within the container enclosure shown in FIG. 8B.

In another variation of a container enclosure, as shown in FIGS. 8-10, a compact container enclosure (e.g., assembly) may be used with an associated temperature control system. With respect to the container enclosure depicted in FIGS. 6A-6D, the removable container enclosure includes an adapter but not a thermal conductor. Instead, a temperature control device includes a thermal conductor fixedly coupled to a thermal source. This may reduce the number of disposable components used in controlling a temperature of a biological substance. FIG. 8A is a schematic side view of a container (800). FIG. 8B is a schematic cross-sectional side view of an illustrative variation of the container (800) partially received within an adapter (810) (e.g., sleeve) of a container enclosure. FIG. 8C is a schematic cross-sectional side view of the container (800) fully received within the adapter (810). The container (800) may have any shape or size and the corresponding adapter (810) may have a corresponding shape and size suitable to receive the container (800), as well as any of the features described with respect to the adapters described herein. For example, in variations in which a cylindrical container (800) is employed, the adapter (810) may also have a cylindrical shape, whereas in variations in which a container with a rectangular cross-sectional shape is employed, the adapter (810) may have a rectangular cross-sectional shape. In some variations, the adapter may be in the form of a sleeve with open ends, closed ends, or a combination thereof (i.e., one open end and one closed end). In some variations, the adapter (810) may be composed of a thermally conductive rigid material and have dimensions configured to receive the container (800) with an interference fit. In some variations, the adapter (810) may function as a thermal interface between the container (800) and one or more of a thermal conductor and thermal source (not shown). In some variations, the adapter (800) may comprise one or more of a metal, ceramic, polymer, and silicone. In some variations, the adapter (800) may be open at one or more ends to allow one or more of an identifier and contact temperature sensor to contact the container (800). In some variations, at least a portion of the adapter (800) may be transparent to aid visual identification of the container (800). In some variations, the adapter (810) may comprise the temperature sensor (830). For example, one or more temperature sensors may be disposed on an inner surface of the adapter (810) and configured to contact the container (800). In some variations, the adapter (810) may comprise the identifier (820). For example, the identifier (820) may be configured to overlie or overlap a bottom portion of the container (800). The adapter (810) may be configured for limited use (e.g., single use).

Figures 9A, 9B:
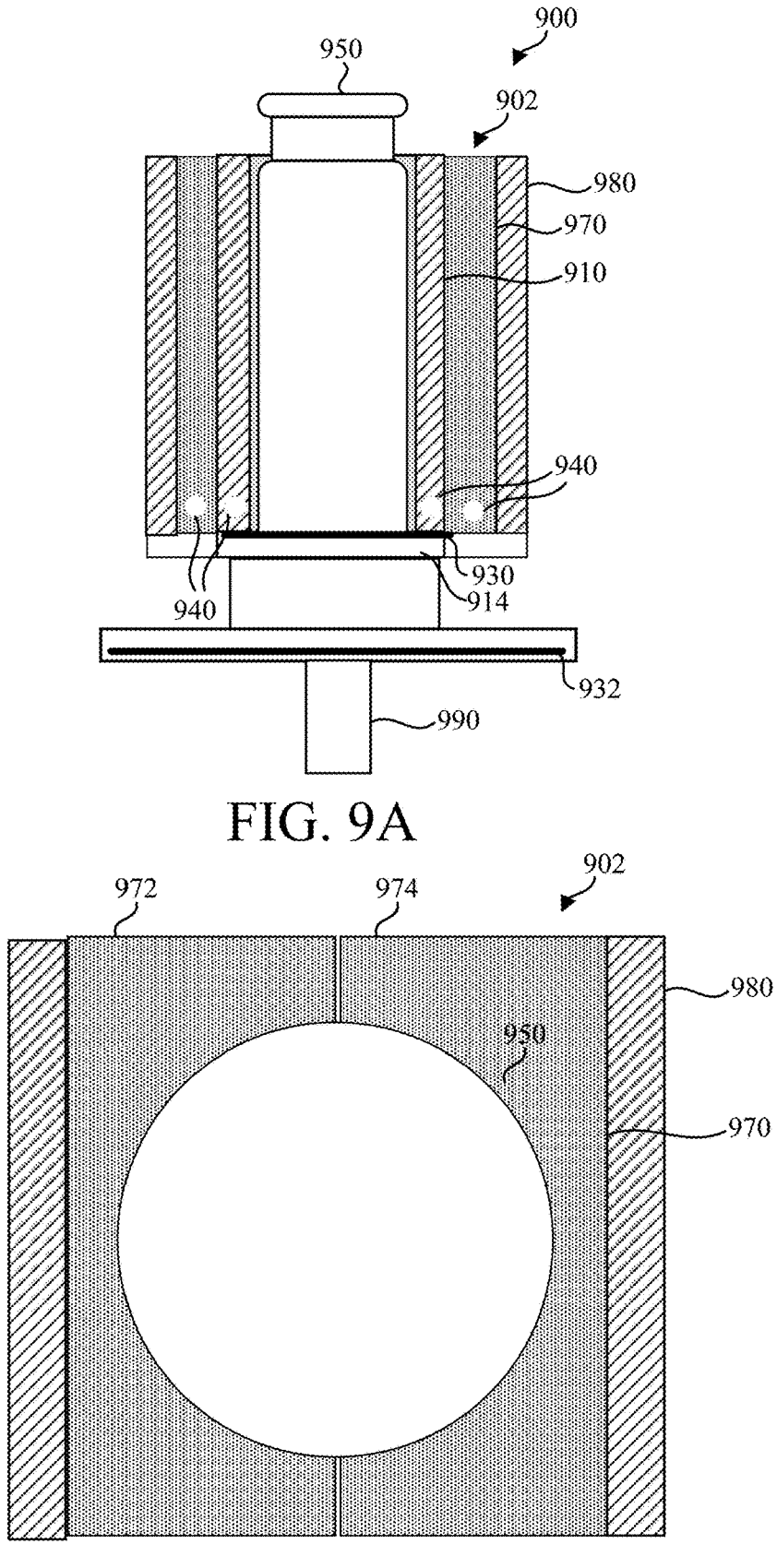
FIG. 9A is a schematic cross-sectional side view of an illustrative variation of a temperature control system configured to control a temperature of a biological substance.
FIG. 9B is a schematic plan view of the system shown in FIG. 9A.

FIG. 9A is a schematic cross-sectional side view of an illustrative variation of a temperature control system (900) comprising a temperature control device (902) configured to control a temperature of a biological substance received within a container enclosure (950). FIG. 9B is a schematic plan view of the system (900). The container (950) and adapter (910) may be releasably coupled to a thermal conductor (970) of the temperature control device (902). The temperature control device (902) may comprise a conductive housing (914) having a thermal conductor (970), an identifier reader (932), temperature sensor (940), thermal source (980), and agitator (990). The container (950) may be received within the adapter (910) of the container enclosure, and the container enclosure may be received within a chamber formed between the conductive housing (914). For example, the conductive housing (914) receiving (e.g. holding) the adapter (910) and the container (950) may be configured to be received in the chamber of the temperature control device (902), which is formed between the conductive housing (914). In this manner, the thermal source (980) may be in thermal communication with the thermal conductor (970). In this way, the temperature control device (902) may control the temperature of the biological substance in the container (950).

In some variations, the temperature sensor (940) may comprise a thermistor. For example, one or more temperature sensors (940) may be coupled to the thermal conductor (970) and/or thermal source (980). The thermal conductor (970) may be configured to surround the container (950), as shown in FIG. 9B. The container enclosure in FIGS. 9A and 9B may include the adapter (910). In some variations, the thermal source (980) may comprise a Peltier element. In some variations, the Peltier element may be configured to regulate temperature by generating heat or cooling as desired. In some variations, one or more of the thermal conductor (970), thermal source (980), and agitator (990) may comprise reusable (e.g., durable) components while the adapter (910) and container (850) may be configured for limited (e.g., single) use. In some variations, the adapter (910) may comprise an inner diameter of up to about 1 mm greater than an outer diameter of the container (950). In some variations, the temperature control device (902) may comprise a plurality of thermal sources (980) such that thermal sources (980) are positioned on several sides of the container enclosure and/or the thermal source (980) may be configured to surround the container enclosure, as shown in FIG. 9B.

In some variations, the identifier reader (932) (e.g., RFID reader) may be configured to communicate with the identifier (930) to receive data corresponding to the biological substance. For example, the reader (932) may be configured to receive one or more of biological substance data, the measured temperature from one or more of the identifier (930) and the temperature sensor (940), and authentication data. Additionally or alternatively, the reader (932) may comprise an optical sensor configured to generate an image of the identifier (930). In some variations, the identifier (930) and the reader (932) may be placed within a predetermined proximity (e.g., adapter (910) within the chamber of the temperature control device (902)) to facilitate communication and/or data transfer.

In some variations, the housing (914) of the temperature control device (902) may be configured to transition between an open configuration and a closed configuration to aid in placement and removal of the container (950) within the temperature control device (900). The closed configuration may be configured to hold the container (950) within a chamber of the temperature control device (902). In the open configuration, an operator may more easily place and remove the adapter (910) and container (950) within the chamber of the temperature control device (902).

In some variations, the temperature control device (902) may be configured to transition between open and closed configurations. For example, FIG. 9B illustrates a first portion (972) and second portion (974) of the conductive housing (914) where the first portion (972) and second portion (974) may be configured to pivot relative to each other in order to facilitate access to the temperature control device (902), thereby aiding insertion and removal of the container (950) from the temperature control device (902). In some variations, the first portion (972) and the second portion (974) may be coupled by a hinge (not shown) such that one of the portions remains fixed in place while the other portion may swing like a door. In some variations, the first portion (972) and the second portion (974) may slide relative to each other. The agitator (990) may be configured to raise or lower the container (950) and adapter (910) relative to the conductive housing (914) to facilitate insertion and removal of the container (950) from the temperature control device (902). For example, the container (950) and adapter (910) may be inserted vertically into the cavity of the temperature control system (900).

Figure 10A:
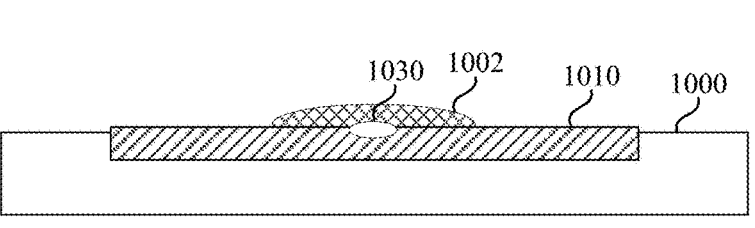
FIG. 10A is a schematic cross-sectional view of an illustrative variation of a sensor and an identifier.

In some variations, the temperature sensor and identifier may be integrated within a container enclosure to improve temperature measurement of a biological substance. FIG. 10A is a schematic cross-sectional view of an illustrative variation of a sensor (1030) and an identifier (1010) disposed within a support (1000) of an adapter or thermal conductor. FIG. 10B is a schematic cross-sectional view of another illustrative variation of a sensor (1032) and an identifier (1012) disposed within a support (1050) of the container enclosure. In some variations, the support (1000, 1050) (e.g., sleeve, thermal conductor) may comprise a protrusion (1002, 1052) (e.g., hemi-sphere, curved portion) configured to releasably contact a bottom portion of a container (not shown). The protrusion (1002, 1052) may ensure contact with a container and increase the accuracy of temperature measurements.

In some variations, a wired connection may be formed between a reader and one or more of a temperature sensor and identifier. For example, the housing (1050) may comprise a first connector (1090) coupled to the temperature sensor (1032) and a second connector (1092) coupled to the identifier (1012). Each connector (1090, 1092) may be disposed on an outer surface of the housing (1050) and comprise a lead wire configured to couple to a reader (not shown) to transfer data such as temperature measurements and data corresponding to the biological substance.

Figure 10C:
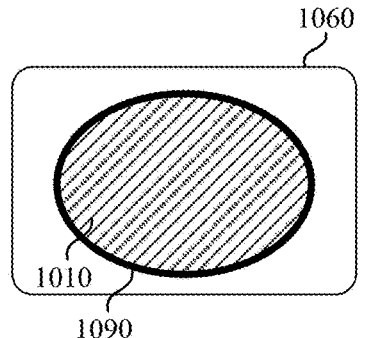
FIG. 10C is a schematic bottom view of an illustrative variation of the sensor and the identifier.
Figure 10B:
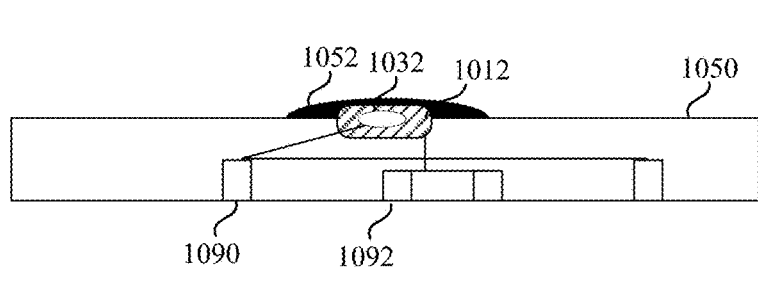
FIG. 10B is a schematic cross-sectional view of another illustrative variation of a sensor and an identifier.

FIG. 10C is a schematic bottom view of an illustrative variation of the sensor connector (1090) and an identifier (1010). For example, a portion of the identifier (1010) may be exposed on an outer surface of a support and a connector (1090) coupled to a sensor (e.g., temperature sensor) may form a ring shape. A reader (not shown) may be configured to contact the identifier (1010) and sensor connector (1090) to receive data from one or more of the identifier (1010) and the sensor connector (1090), for example using the temperature control system (900) shown in FIG. 9A.

Figure 10D:
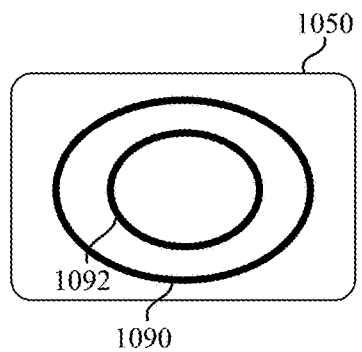
FIG. 10D is a schematic bottom view of the sensor and the identifier shown in FIG. 10B.

FIG. 10D is a schematic bottom view of the sensor connector (1090) and the identifier (1092) shown in FIG. 10B. An outer surface of the support (1050) may comprise one or more ring connectors (1090, 1092) configured to contact a corresponding reader (not shown) to receive data from one or more of the identifier (1012) and the sensor (1032) as shown in FIG. 10B. In some variations, a temperature regulation process may be inhibited unless contact between the connector(s) (1090, 1092) is made to a reader to ensure that the container is in a predetermined position for heat transfer. In this way, the temperature control system may be configured to detect whether the container is properly placed within the temperature control device, so as to enable a temperature control process to be executed.

Figures 19A, 19B:
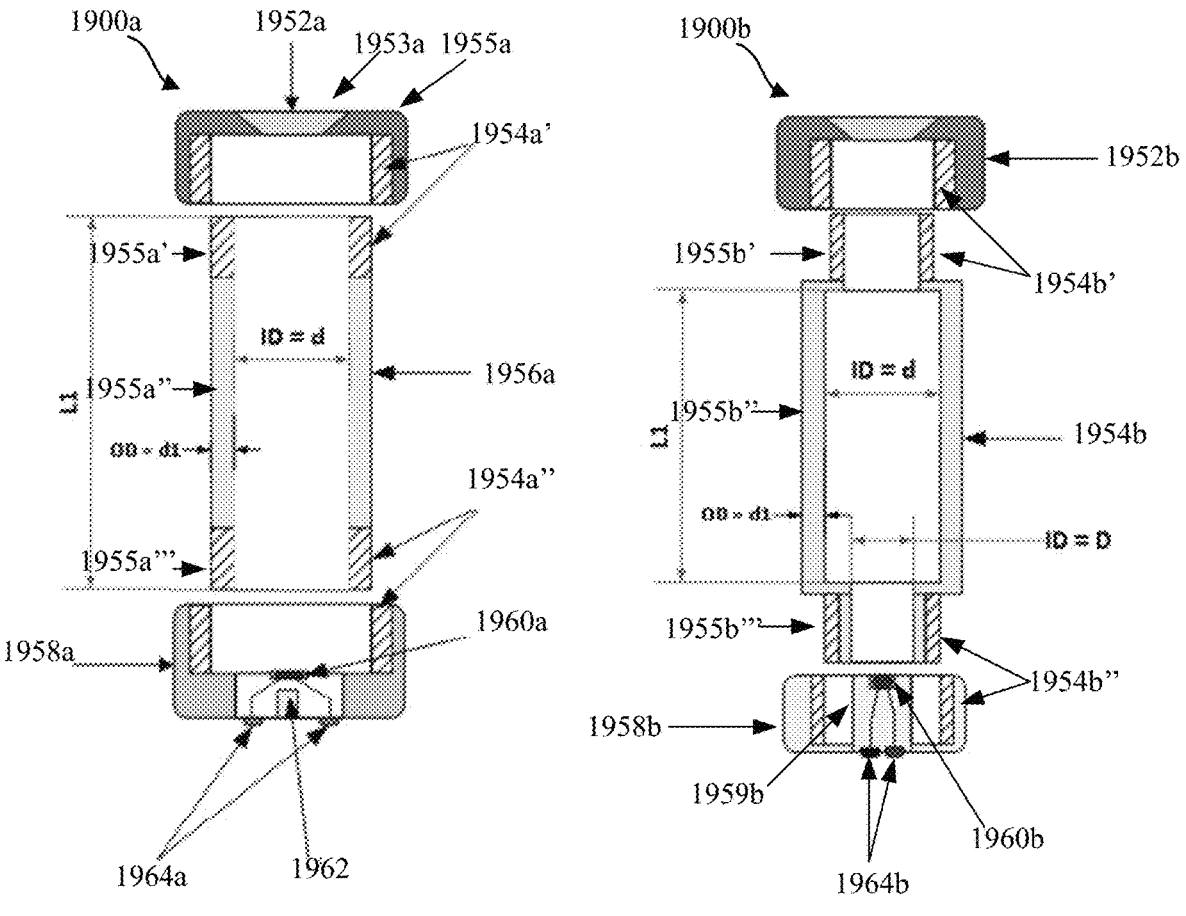
FIG. 19A is a schematic cross-sectional view of an illustrative variation of a container for holding a biological substance.
FIG. 19B is another schematic cross-sectional view of an illustrative variation of a container for holding a biological substance.

FIG. 19A is a schematic cross-sectional view of an illustrative variation of a container (1900a) for holding a biological substance. The container (1900a) may be received in any suitable temperature control device described herein. For instance, the container (1900a) may be received in a chamber and/or a container enclosure of a temperature control device (e.g., within a cavity of a chamber and/or a cavity of a container enclosure) as described herein. In some variations, the container (1900a) may be received in a temperature control device without an adapter. In such variations, a top portion (described below) of the container (1900a) and/or a bottom portion (described below) of a container (1900a) may hold the container (1900a) in position (e.g., upright position, aligned with respect to one or more electrical contacts of temperature sensor(s), and/or aligned with respect to thermal source(s) and/or thermal conductor(s)) within the temperature control device. For example, the container (1900a) may be received within temperature control device (202) described in FIG. 2C. In particular, the container (1900a) may be received within the chamber (222) of the temperature control device (202). Additionally or alternatively, the container (1900a) may be received within the temperature control device (204) depicted in FIG. 2C. For instance, the container (1900a) may be received within the cavity (223) of the temperature control device (204). In a similar manner, the container (1900a) may be received in a container enclosure (600) described in FIGS. 6A-6D. More specifically, the container (1900a) may be received within a cavity (612) of the container enclosure (600) with thermal conductor (610). Similarly, the container (1900a) may be received within temperature control device (702) described in FIGS. 7A and 7B. In a similar manner, the container (1900a) may be received within temperature control device (902) in FIG. 9A.

The container (1900a) may include a top portion (1952a), a bottom portion (1958a), and a body portion (1956). The top portion (1952a) may be a covering (1955a) (e.g., cap, lid). In some variations, the covering 1955a may include an opening (1953a) to receive the biological substance. The opening (1953a) may be sealed after the container (1900a) receives the biological substance. In some variations, the opening (1953a) may include a septum through which the biological substance may be received. In some variations, the biological substance may be injected into the container (1900a) through the opening (1953a). Additionally or alternatively, the covering (1955a) itself may act as seal when the biological substance is received in the container (1900a). For example, the covering (1955a) may be a lid that may be opened to receive the biological substance and closed to seal the biological substance within the container (1900a). The top portion may comprise one or more polymers that may be resistant to high temperatures such as, for example, Polytetrafluoroethylene (PTFE), Polychlorotrifluoroethylene (PCTFE), Fluorinated ethylene propylene (FEP), etc.

In some variations, one or more of the top portion (1952a), bottom portion (1958a), and body portion (1956a) may comprise a connector configured to mate, receive, or otherwise couple the top portion (1952a) and bottom portion (1958a) to the body portion (1956a). In variations in which the top portion (1952a) and/or bottom portion (1958a), and the body portion (1956a) each comprise a connector, the connectors on the top portion (1952a) and/or bottom portion (1958a) may be corresponding connectors with the respective connectors on the body portion (1956a). For example, the top portion (1952a) may include a connector (1954a') configured to couple the top portion (1952a) with the body portion (1956a). Additionally or alternatively, the body portion (1956a) may include a connector (1954a') configured to couple the top portion (1952a) with the body portion (1956a). For instance, the connector (1954a') of the body portion (1956a) may be configured to mate with the connector (1954a') of the top portion (1952a). The connector (1954a') of the body portion (1956a) may be configured to couple with the connector (1954a') of the top portion (1952a). In some variations, the connector (1954a') of the top portion (1952a) and/or the body portion (1956a) may include thread(s), adhesive(s), one or more snap-fit assembly, a combination thereof, and/or the like. The top portion (1952a) may be coupled with the body portion (1956a) in any suitable manner. For example, the top portion (1952a) and the body portion (1956a) may be coupled to one other via a molding process such as overmolding. Additionally or alternatively, the top portion (1952a) and the body portion (1956a) may be attached to one other via an adhesive. Additionally or alternatively, the top portion (1952a) and the body portion (1956a) may be coupled to one other via a snap-fit connection. Additionally or alternatively, the connector (1954a') of the top portion (1952a) and the body portion (1956a) may include threaded structures configured to couple the top portion (1952a) with the body portion (1956a). In some variations, the top portion (1952a) may be fixedly coupled to the body portion (1956a) via the connector (1954a'). Additionally or alternatively, the top portion (1952a) may be removably coupled to the body portion (1956a) via the connector (1954a').

In some variations, the top portion (1952a) may include a chamber or hollow portion configured to receive a proximal end of the body portion (1956a). The hollow portion of the top portion (1952a) may have a length between about 3 mm and about 20 mm (including all values and sub-ranges therein) and/or a diameter (e.g., inner diameter of top portion) of between about 15 mm and about 30 mm (including all values and sub-ranges therein). For example, the hollow portion of the top portion (1952a) may have a length of between about 5 mm and about 18 mm, between about 7 mm and about 16 mm, between about 9 mm and about 14 mm, or between 10 mm and about 12 mm. The hollow portion of the top portion (1952a) may have a diameter of between about 18 mm and about 28 mm, between about 20 mm and about 26 mm, or between about 22 mm and about 24 mm. The entire top portion (1952a) may have a length between about 5 mm and about 25 mm (including all values and sub-ranges therein) and/or a diameter (e.g., outer diameter of top portion) of between about 17 mm and about 30 mm (including all values and sub-ranges therein). For example, the entire top portion (1952a) may have a length of between about 6 mm and about 20 mm, between about 8 mm and about 18 mm, between about 10 mm and about 16 mm, or between about 12 mm and about 14 mm. The entire top portion (1952a) may have a diameter of between about 18 mm and about 28 mm, between about 20 mm and about 26 mm, or between about 22 mm and about 24 mm.

The body portion (1956a) may be configured to hold the biological substance. The body portion (1956a) may comprise a proximal end (1955a'), which may include the connector (1954a'), a central portion (1955a''), and a distal end (1955a'''), which may include a connector (1954a''). The proximal end (1955a') of the body portion (1956a) may be configured to couple with the top portion (1952a) and the distal end (1955a''') of the body portion (1956a) may be configured to couple with the bottom portion (1958a). For example, the proximal and distal ends of the body portion may be configured to be received in a chamber in the top portion (1952a) and a chamber in the bottom portion (1958a) respectively. In some variations, an outer dimension (e.g., diameter, width) of the proximal end (1955a') of the body portion (1956a) may be equal to a dimension (e.g., diameter, width) of the chamber of the top portion (1952a) (e.g., may be equal to an inner dimension (e.g., diameter, width) of the top portion). In some variations, the diameter/width of the proximal end (1955a') may be equal to a diameter/width of the central portion (1955a''). In a similar manner, the diameter/width of the central portion (1955a'') may be equal to the diameter/width of the distal end (1955a''').

In some variations, the length $L_1$ and the diameter (or width) d (e.g., diameter of the proximal, central, and/or distal portion) of the body portion may be such that the body portion (1956a) may hold the biological substance between a volume of about 1 mL and about 10 mL, including all values and sub-ranges therein. For example, the length $L_1$ and the diameter d of the body portion may be such that the body portion (1956a) may hold the biological substance between a volume of about 2 mL and about 8 mL, about 4 mL and about 7 mL, or about 5 mL and about 6 mL. In some variations, the length $L_1$ and the diameter d of the body portion may be such that the body portion (1956a) may hold the biological substance between a volume of about 10 mL and about 20 mL, including all values and sub-ranges therein. For example, the length $L_1$ and the diameter d of the body portion may be such that the body portion (1956a) may hold the biological substance between a volume of about 12 mL and about 18 mL, about 14 mL and about 17 mL, or about 15 mL and about 16 mL. The length $L_1$ of the body portion may be between about 20 mm and about 15 mm, including all values and sub-ranges therein. For example, the length $L_1$ of the body portion may be between about 19 mm and about 16 mm, or between about 18 mm and about 17 mm. The diameter d of the body portion may be between about 15 mm and about 30 mm, including all values and sub-ranges therein. For example, the diameter d of the body portion may be between about 16 mm and about 28 mm, between about 18 mm and about 26 mm, between about 20 mm and about 24 mm, or between about 22 mm and about 23 mm.

The body portion (1956a) may also include a connector (1954a'') to couple (e.g., fixedly, releasably) the body portion (1956a) with the bottom portion (1958a). Similarly to the top portion (1952a), the bottom portion (1958a) may additionally or alternatively include a connector (1954a''). The connector (1954a'') of the body portion (1956a) may be configured to mate with the connector (1954a'') of the bottom portion (1958a). In some variations, the connector (1954a'') of the body portion (1956a) and/or the bottom portion (1958a) may include thread(s), adhesive(s), one of more snap-fit assembly, a combination thereof, and/or the like. Similarly to the top portion (1952a), the bottom portion (1958a) may be coupled with the body portion (1956a) in any suitable manner. For example, the bottom portion (1958a) and the body portion (1956a) may be coupled to one another via a molding process such as overmolding. Additionally or alternatively, the bottom portion (1958a) and the body portion (1956a) may be attached to one other via an adhesive. Additionally or alternatively, the bottom portion (1958a) and the body portion (1956a) may be coupled to one another via a snap-fit connection. Additionally or alternatively, the connector (1954a'') of the bottom portion (1958a) and the body portion (1956a) may include threaded structures configured to couple the bottom portion (1958a) with the body portion (1956a). In some variations, the bottom portion (1958a) may be fixedly coupled with the body portion (1956a). Additionally or alternatively, the bottom portion (1958a) may be removably coupled with the body portion (1956a).

In some variations, the bottom portion (1958a) may include a chamber or hollow portion configured to receive the distal end of the body portion (1956a). The hollow portion of the bottom portion (1958a) may have a length between about 3 mm and about 20 mm (including all values and sub-ranges therein) and/or a diameter (e.g., inner diameter of bottom portion) of between about 15 mm and about 30 mm (including all values and sub-ranges therein). For example, the hollow portion of the bottom portion (1958a) may have a length of between about 5 mm and about 18 mm, between about 7 mm and about 16 mm, between about 9 mm and about 14 mm, or between 10 mm and about 12 mm. The hollow portion of the bottom portion (1958a) may have a diameter of between about 18 mm and about 28 mm, between about 20 mm and about 26 mm, or between about 22 mm and about 24 mm. The entire bottom portion (1958a) may have a length between about 5 mm and about 25 mm (including all values and sub-ranges therein) and/or a diameter (e.g., outer diameter of bottom portion) of between about 17 mm and about 30 mm (including all values and sub-ranges therein). For example, the entire bottom portion (1958a) may have a length of between about 6 mm and about 20 mm, between about 8 mm and about 18 mm, between about 10 mm and about 16 mm, or between about 12 mm and about 14 mm. The entire bottom portion (1958a) may have a diameter of between about 18 mm and about 28 mm, between about 20 mm and about 26 mm, or between about 22 mm and about 24 mm.

In some variations, an outer dimension (e.g., diameter, width) of the distal end ($1955a'''$) of the body portion ($1956a$) may be equal to a dimension (e.g., diameter, width) of the chamber of the bottom portion ($1958a$) (e.g., may be equal to an inner dimension (e.g., diameter, width) of the bottom portion). In some variations, the bottom portion ($1958a$) may include a guide or alignment feature ($1962$) configured to assist in positioning the container within and relative to a temperature control device (e.g., a cavity of a temperature control device, a chamber of a temperature control device) and/or a container enclosure. For example, the guide or alignment feature may be configured to interact with (e.g., receive, be received within) a corresponding guide or alignment feature of a temperature control device (e.g., within a cavity or chamber of a temperature control device) and/or a container enclosure. The guide ($1962$) may include any suitable mechanism (e.g., a slot, a cavity, a hole, a groove, a protrusion) configured to position the container ($1900a$) relative to the temperature control device and/or container enclosure. In some variations, the guide may be used to center the container ($1900a$) when the container ($1900a$) is placed in the temperature control device. For example, the container guide may be configured to interact with a temperature control device guide and/or a container enclosure guide to center the container ($1900a$) within a cavity or chamber of the temperature control device and/or within a container enclosure, to position and/or maintain the container ($1900a$) in an upright position, and/or to align the container ($1900a$) with or relative to one or more electrical contacts or connectors (e.g., for temperature sensor $1960a$ in FIG. 19A), one or more thermal sources, and/or one or more thermal conductors.

In some variations, the bottom portion ($1958a$) may include one or more temperature sensors ($1960a$) to measure a temperature of the biological substance in the container ($1900a$). The temperature sensor ($1960a$) may be positioned on a surface (e.g., an inner surface of the bottom portion ($1958a$)) near (e.g., adjacent to) the biological substance (e.g., adjacent to the central portion ($1955a''$) of the body portion ($1956a$) holding the biological substance). In some variations, the temperature sensor ($1960a$) may comprise a thermocouple. In some variations, the bottom portion ($1958a$) may include electrical contacts for the temperature sensor ($1960a$). For example, electrical contacts ($1964a$) may be positioned on a surface (e.g., outer surface) of the bottom portion ($1958a$) such that the electrical contacts ($1964a$) may interact with the temperature control device. Although, FIG. 19A illustrates a container ($1900a$) with a single temperature sensor ($1960a$), it should be readily understood that the container ($1900a$) may comprise any suitable number of temperature sensors ($1960a$). For example, the container ($1900a$) may include two, three, four, five, six, seven, or eight temperature sensors. The temperature sensors may be positioned in any suitable configuration. For instance, some temperature sensors may be positioned on the bottom portion ($1958a$) while other temperature sensors may be positioned on the top portion ($1952a$). Additionally or alternatively, the temperature sensors may be positioned in a circular configuration on the bottom portion ($1958a$). In some variations, the temperature sensors may be positioned in a line across (e.g., along the diameter; along a central line, in an X shape, in a cross shape) of the hollow portion of the bottom portion ($1958a$).

In some variations, each temperature sensor ($1960a$) may be configured to measure the same temperature range, advantageously providing several temperature measurements for a biological substance in the container during a thawing process. For example, one or more temperature sensors may be configured to measure the following temperature ranges: about −200° C. to about −80° C., about −80° C. to about −30° C., about −30° C. to about 0° C., or about 0° C. to about 50° C. In other variations, the container ($1900a$) may include a plurality of temperature sensors configured to measure different temperature ranges. For example, a first temperature sensor may be configured to measure temperatures ranging between about −200° C. to about −80° C., a second temperature sensor may be configured to measure temperatures ranging between about −80° C. to about −30° C., a third temperature sensor may be configured to measure temperatures ranging between about −30° C. to about 0° C., and a fourth temperature sensor may be configured to measure temperatures ranging between about 0° C. and about 50° C. Having multiple temperature sensors may improve the resolution of temperature measure and decrease possibilities of error and/or may allow a single container to be capable of use with a variety of different biological substances. In some variations, the bottom portion may comprise one or more polymers that may withstand extreme temperatures (e.g., low temperatures) such as PTFE, PCTFE, FEP, etc. A length and/or diameter of the bottom portion ($1958a$) may be any of the lengths and/or diameters described above with respect to the top portion. In some variations, the length of the top portion ($1952a$) may be equal to the length of the bottom portion ($1958a$). In some variations, the diameter/width of the top portion ($1952a$) may be equal to the diameter/width of the bottom portion ($1958a$).

The container ($1900a$) (e.g., top portion, bottom portion, body portion) may comprise any shape suitable to hold the biological substance, and may be, for example, cylindrical, rectangular, frustoconical, pyramidal, a triangular prism, or the like.

FIG. 19B is a schematic cross-sectional view of another variation of a container ($1900b$) for holding a biological substance. Similar to FIG. 19A, FIG. 19B may include a container ($1900b$) with a top portion ($1952b$), a body portion ($1956b$), and a bottom portion ($1958b$). The body portion ($1956b$) may include a proximal end ($1955b'$), a central portion ($1955b''$), and a distal end ($1955b'''$). The top portion ($1952b$) may include a connector ($1954b'$) that may be coupled to the connector ($1954b'$) of the proximal end ($1955b'$) of the body portion ($1956b$). The bottom portion ($1958b$) may include a connector ($1954b''$) that may be coupled to the connector ($1954b''$) of the distal end ($1955b'''$) of the body portion ($1956b$). The bottom portion ($1958b$) may include a temperature sensor ($1960b$) with electrical contacts ($1964b$). In some variations, the container ($1900b$) in FIG. 19B may include one or more same features described with respect to FIG. 19A. For example, the top portion ($1952b$) may include an opening and/or a septum as described in FIG. 19A. Similarly, the bottom portion ($1958b$) may include a guide element as described in FIG. 19A.

In contrast to FIG. 19A, in FIG. 19B, the diameter/width of the central portion ($1955b''$) of the body portion ($1956b$) may be different from the diameter/width of the proximal end ($1955b'$) and/or the distal ends ($1955b'''$). More specifically, referring to FIG. 19B in particular, which depicts a cylindrically shaped container, the diameter of the proximal end ($1955b'$) may be such that the proximal end ($1955b'$) may be received within the hollow portion of the top portion ($1952b$). For instance, the diameter of the proximal end ($1955b'$) may be less than or about equal to a diameter of the hollow portion of the top portion ($1952b$) (an inner diameter of the top portion (1952b)). In some variations, a connector (1954b') at the proximal end (1955b') may mate with a connector (1954b') of the top portion (1952b). In a similar manner, the outer diameter/width of the distal end (1955b''') may be such that the distal end (1955b''') may be received within the hollow portion of the bottom portion (1958b). For instance, the outer diameter/width of the distal end (1955b''') may be less than or about equal to a diameter of the hollow portion of the bottom portion (1958b) (an inner diameter of the bottom portion (1958b). The outer diameters/widths of the top and/or bottom portions (1952b, 1958b) may be any diameter/width suitable to interface with a temperature control device and may be independent from the inner diameter/width of the top and/or bottom portions (1952b, 1958b).

The central portion (1955b'') of the body portion (1958b) may be configured to hold the majority of, or all of, the volume of the biological substance. Thus, in some variations, it may be desirable for the central portion (1955b'') to have a different diameter/width than the proximal (1955b') and/or distal (1955b''') ends, which may be configured to be received in the top (1952b) and/or bottom (1958b) portions, respectively. Put another way, while the diameters/widths of the proximal end (1955b') and/or the distal end (1955b''') may be constrained by the ability to mate and/or fit within the top portion (1952b) and the bottom portion (1958b) respectively, which may, in some variations, be constrained by the ability to interface with a temperature control device, the diameter of the central portion (1955b'') is not so limited. Thus, the diameter/width of the central portion (1955b'') may be different (e.g., larger, smaller) than the diameter/width of one or more of the proximal end (1955b') and the distal end (1955b''') of the body portion, which may allow for containers with different volumes to be used interchangeably with the same top portion and/or bottom portion. Thus, the central portion (1955b'') may have any suitable length and/or diameter/width so as to accommodate a biological substance of any suitable volume while the top portion (1952b) and the bottom portion (1958b) may still be configured to interact with a temperature control device. In this manner, body portions (1958b) configured to hold different volumes (e.g., body portions with different central portion lengths and/or diameters/widths) may be used with standard top portions (1952b) and bottom portions (1958b) such that body portions configured to hold different volumes may be interchangeable with the same or similar top and/or bottom portions.

In some variations, the bottom portion (1958b) may include a stem (1959b) (depicted in FIG. 19B) extending from a distal surface toward and in some variations, to, a proximal end of the bottom portion. In some variations, the stem may be centrally located within the bottom portion (1958b) and additionally or alternatively may be substantially solid. The stem (1959b) may be configured to be received within the distal end (1955b'') of the body portion and may be configured to appropriately position one or more temperature sensors (1960) relative to the biological substance within the container. The stem (1959b) may include one or more temperature sensors (1960b) (e.g., positioned at a proximal end thereof) and electrical connectors for the temperature sensors (1960b), which may traverse the stem to electrically couple the temperature sensors (1960b) with corresponding electrical contacts (1964b). The electrical contacts (1964b) may be positioned on a distal surface of the stem so as to interact with corresponding contacts of a temperature control device. In some variations, one or more temperature sensors (1960b) may be inset in, or otherwise received in, a cavity in the stem. The stem (1959b) may align the temperature sensor (1960b) such that the temperature sensor (1960b) may be near (e.g., adjacent to) the central portion (1955b'') of the body (1956b), which holds the biological substance.

Figure 12:
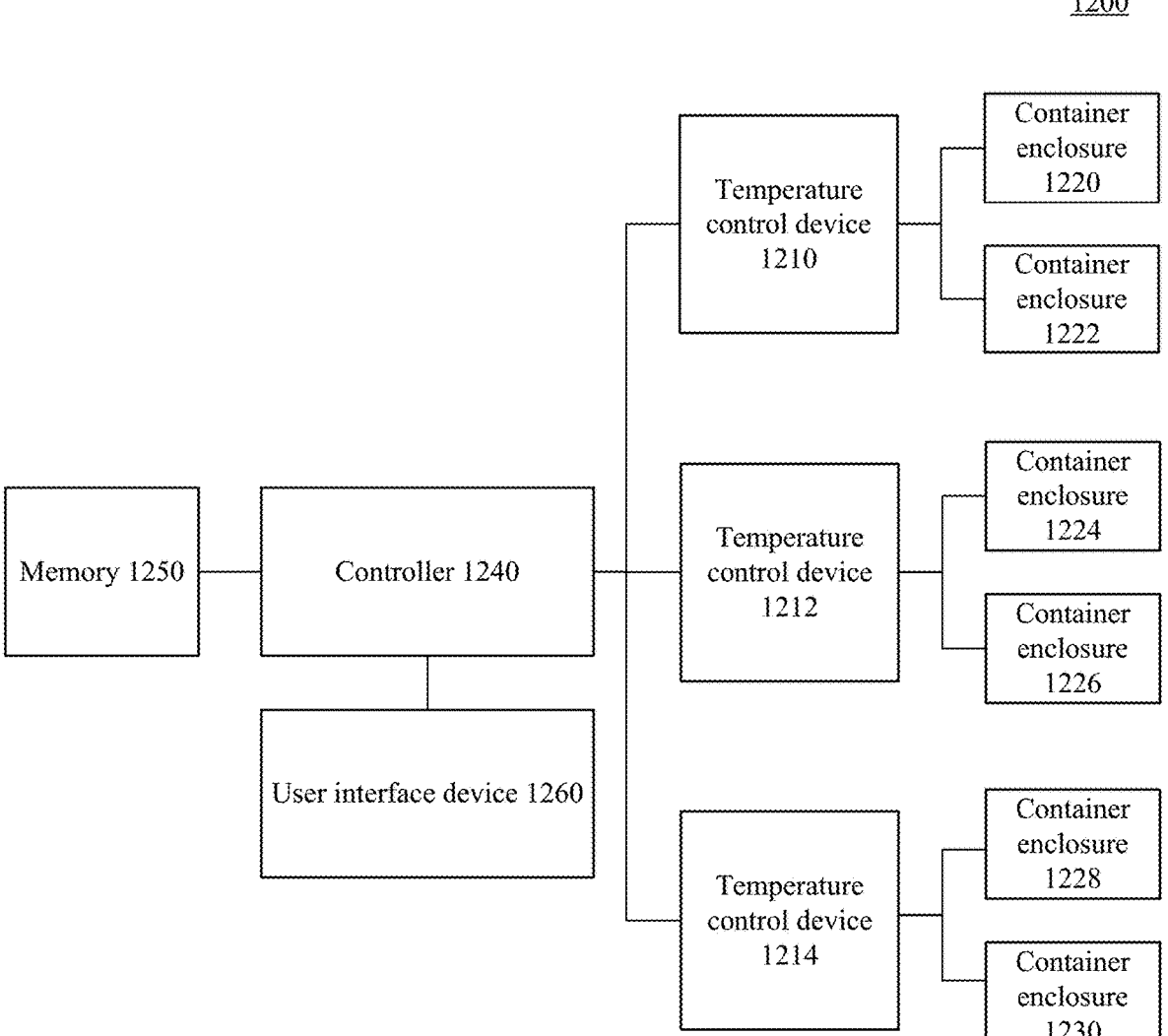
FIG. 12 is a schematic block diagram of an illustrative variation of a temperature control system configured to control a temperature of a biological substance.

FIG. 12 is a schematic block diagram of an illustrative variation of a system (1200) configured to control the temperature of a plurality of biological substances. The system (1200) may comprise a plurality of temperature control devices (1210, 1212, 1214), controller (1240), memory (1250), and user interface device (1260). In some variations, the controller (1240) may be coupled to one or more of the temperature control devices (1210, 1212, 1214) over wired and/or wireless communication links (e.g., network, Internet, LAN) as described in more detail herein. Each temperature control device (1210, 1212, 1214) may be coupled to one or more container enclosures (1220, 1222, 1224, 1226, 1228, 1230). The heating algorithm applied to each container may be based on at least the type of biological substance (e.g., blood, vaccine, etc.) and volume of each respective container in the container enclosure (1220, 1222, 1224, 1226, 1228, 1230). For example, a blood bag having a volume of about 500 mL may be thawed at a different rate than a vial of mRNA vaccine having a volume of about 5 mL. In some variations, each temperature control device (1210, 1212, 1214) may comprise a respective user interface (e.g., input device, output device) configured to receive a control signal and provide output to an operator. Similarly, the controller (1240) may be coupled to a user interface device (1260) for remote operation of the temperature control systems (1210, 1212, 1214). In some variations, the controller (1240) may be coupled to a memory (1250) (e.g., database, Electronic Information System).

In some variations, a system (1200) may comprise a plurality of devices (1210, 1212, 1214) configured to control a temperature of a biological substance. Each device (1210, 1212, 1214) may comprise one or more temperature sensors, such as a temperature sensor configured to measure a temperature of the biological substance and/or a temperature sensor configured to measure a temperature of a thermal conductor, and an identifier of to the biological substance. A controller (1240) may be coupled to the plurality of devices (1210, 1212, 1214). The controller (1240) may comprise a processor and memory (1250), and configured to receive the temperature measurements from one or more of the devices, and control the temperature of one or more of the biological substances using one or more of the devices (1210, 1212, 1214) based on the received temperatures for each respective system. In some variations, one or more of the devices (1210, 1212, 1214) may comprise an agitator (not shown in FIG. 12). The controller (1240) may be configured to control agitation of one or more of the devices (1210, 1212, 1214) based on the received temperature. In some variations, controlling the temperature of the biological substance may comprise thawing the biological substance between down to about −80° C. and up to about 37° C. using any of the temperature control systems (100, 200, 202, 204, 700, 900) as described herein.

II. Methods

Also described here are methods for controlling a temperature of a biological substance using the systems and devices described herein. The methods of controlling temperature described herein may facilitate rapid thawing and/or cooling of, for example, a vaccine or other low volume biological substance. For example, when thawing, the methods may raise the temperature of a frozen biological substance to a predetermined temperature (e.g., room temperature) using a container enclosure and associated temperature control device comprising a thermal source (e.g., Peltier element). As another example, the methods may monitor the temperature of the biological substance and facilitate identification and tracking of the biological substance (and corresponding container enclosure and container). In some variations, methods may include use of a temperature control device and a consumable container enclosure configured to receive a container having the biological substance to provide a closed-loop temperature feedback system for temperature control. In these variations, the methods may include pre-heating the device and transitioning the biological substance between an ice stage, liquid stage, and standby stage based at least in part on temperature sensor measurements and/or other parameters such as biological substance type, weight, and volume. Additionally or alternatively, methods may include adjusting one or more of the above mentioned parameters based on user input.

Figure 13:
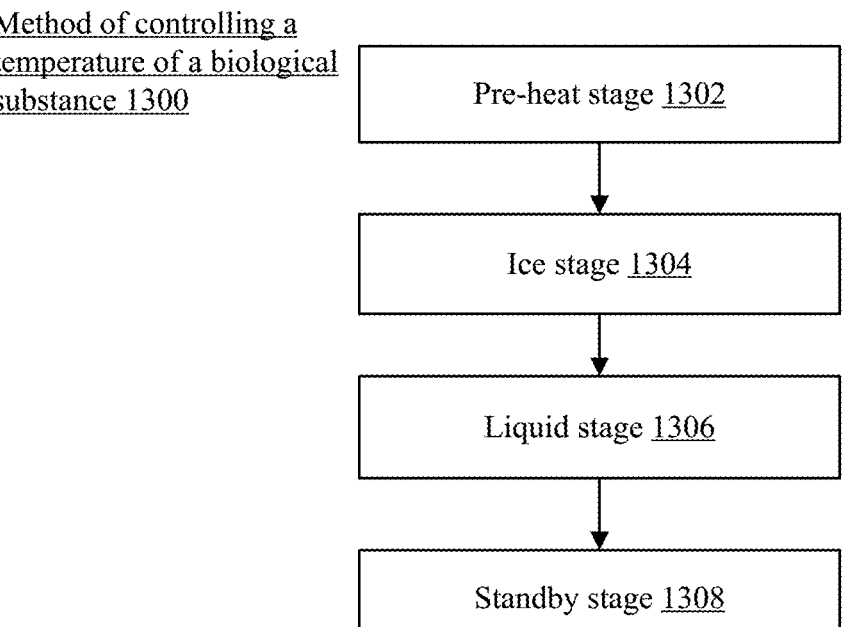
FIG. 13 is a flowchart of an illustrative variation of a method of controlling a temperature of a biological substance.

FIG. 13 is a flowchart of an illustrative variation of a method (1300) of controlling a temperature of a biological substance. In some variations, the temperature control device may transition to a pre-heating stage (1302). The pre-heating stage may include a built-in-test (BIT) to initiate a device and determine device characteristics such as temperature. The pre-heating stage may also include setting system parameters. In some variations, pre-heating may comprise maintaining a temperature of one or more elements of the device (e.g., thermal conductor, thermal source) at a predetermined idle temperature when the device is not actively controlling a temperature of a biological substance. The pre-heating stage may, for example, reduce a total time required for thawing a biological substance.

In some variations, the system (e.g., temperature control device) may transition to an ice stage (1304) upon receiving one or more predetermined command signals to increase the temperature of a biological substance by applying heat using a thermal source. In general, the ice stage corresponds to a condition of the biological substance in which a predetermined fraction of the biological substance is solid (e.g., frozen). In some variations, the system may transition to a liquid stage (1306). The liquid stage corresponds to a condition of the biological substance in which a predetermined fraction of the biological substance is liquid (e.g., thawed).

In some variations, the transition from ice stage to liquid stage may occur when the temperature of the biological substance (e.g., transition temperature) is between about 0° C. and about 15° C., including all values and sub-ranges therein. For instance, the transition temperature of the biological substance may be between about 0° C. and about 2° C., between about 0° C. and about 4° C., between about 0° C. and about 6° C., between about 0° C. and about 8° C., between about 0° C. and about 10° C., between about 0° C. and about 12° C., or between about 0° C. and about 14° C. For example, the transition temperature of the biological substance may be about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., or about 15° C. In some variations, the transition from ice stage to liquid stage for vaccines such as mRNA vaccines may occur at about 4° C.

In some variations, the system may heat the biological substance to an endpoint temperature. The container and/or container enclosure holding the biological substance may be removed from the temperature control device after the biological substance has been heated to the endpoint temperature. In some variations, the biological substance may be stored in the system by maintaining the biological substance at the endpoint temperature. In some variations, the endpoint temperature may be the same as the transition temperature. For example, the endpoint temperature may be between about 0° C. and about 15° C., including all values and sub-ranges therein. For instance, the endpoint temperature may be between about 0° C. and about 2° C., between about 0° C. and about 4° C., between about 0° C. and about 6° C., between about 0° C. and about 8° C., between about 0° C. and about 10° C., between about 0° C. and about 12° C., or between about 0° C. and about 14° C. For example, the endpoint temperature may be about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., or about 15° C.

In some variations, the biological substance may be maintained (e.g., in the temperature control device) at a temperature between about −80° C. and about 37° C., including all values and sub-ranges therein. In some variations, the biological substance may be placed in the temperature control device at a temperature between about −80° C. and about 37° C., including all values and sub-ranges therein. For example, the biological substance may be maintained and/or placed in the device at a temperature between about −60° C. and about 30° C., between about −50° C. and about 25° C., between about −40° C. and about 20° C., between about −30° C. and about 15° C., between about −20° C. and about 10° C., between about −10° C. and about 5° C., between about −5° C. and about 4° C., or between about 0° C. and about 2° C. In some variations, to transition from the ice stage to the liquid stage, the biological substance may be thawed to a temperature of about 15° C. In some variations, the container with the biological substance may be removed from the temperature control device after the biological substance has been thawed to the end point temperature.

In some variations, such as, for example, in which the biological substance is a vaccine, (e.g., an mRNA vaccine), one or more of the thermal conductors (e.g., thermal conductors 116, 118 in FIG. 1) and the thermal sources (e.g. thermal sources 112, 114) of a temperature control system (100) may be heated to a temperature of between about 20° C. and about 25° C., including all values and sub-ranges therein. For example, the one or more thermal conductors, thermal sources, and/or the biological substance may be heated to a temperature of about 24° C., about 23° C., about 22° C., or about 21° C. As yet another example, 250 mL of plasma may be thawed in less than about 16 minutes and about 1.5 mL to about 5 mL of an mRNA vaccine may be thawed in less than about 3 minutes.

In some variations, the system may transition to a standby stage (1308). During the standby stage, the temperature of the biological substance may be maintained at the end point temperature. In some variations, the methods described herein may comprise one or more steps described in International Application No. PCT/US2019/031215, filed on May 7, 2019, the entirety of which is hereby incorporated by reference herein.

Methods may generally comprise placing a container comprising a biological substance within a container enclosure, placing the container enclosure in a chamber of a temperature control device (e.g., thawing device), and activating a heating assembly to thaw or otherwise control the temperature of the biological substance in the container. The heating assembly may be controlled using, for example, temperatures received from one or more temperature sensors aligned with the container holding the biological substance. In some variations, methods may further include positioning the container comprising the biological substance in an adapter.

Figure 18:
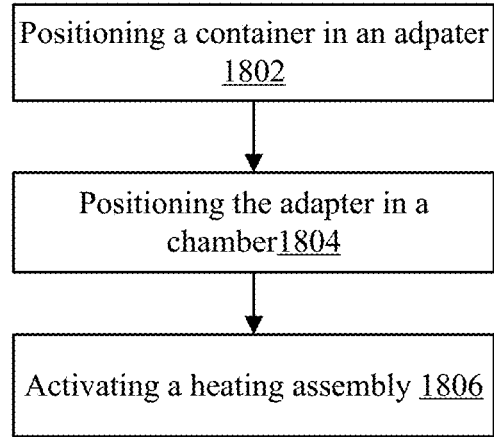
FIG. 18 is a flowchart illustrative of an exemplary method of thawing a low volume biological substance.

FIG. 18 is a flowchart illustrative of an exemplary method (1800) of thawing a biological substance, such as a low volume biological substance. The method may include positioning a container comprising a biological substance in an adapter (1802), positioning the adapter in a chamber of a temperature control device (1804), and activating a heating assembly (1806) of the temperature control device. In some variations, methods may further include positioning the adapter holding the container with the biological substance in a container enclosure, as will be described in more detail below. In some variations, the biological substance may be in a frozen state when the container is positioned within the adapter. The biological substance may comprise one or more of mRNA vaccine, DNA vaccine, exosome, liquid biopsy, blood, cryo-preserved tissue, therapeutic, prophylactic, and/ or cell therapy product. Positioning the container in the adapter may include positioning the container in the adapter with an interference fit. In some variations, positioning the container in the adapter may include positioning the container such that a longitudinal axis of the container may be parallel, about parallel, or transverse (e.g., about perpendicular, or perpendicular) to a longitudinal axis of the adapter. In some variations, positioning the container in the adapter may include positioning the container such that the adapter may overlap at least a portion of the container as described herein. In some variations, positioning the container in the adapter may include positioning an identifier and/or a temperature sensor such that the identifier and/or the temperature sensor may overlie and/or overlap with at least a portion of the container. For example, a temperature sensor integrated into an adapter may be positioned to overlap and/or overlie a center portion of the container. In some variations, positioning the container in the adapter may include positioning the container such that the adapter may hold the container in alignment with one or more temperature sensors and/or identifiers.

In some variations, methods may also include positioning the container having the biological substance contained there (e.g., in a frozen state) in a container enclosure. In some variations, the container may be positioned within the adapter prior to placement of the container in the container enclosure. In these variations, methods may include placing the adapter holding the container in the container enclosure. In other variations, the container may be placed within the adapter during placement within the container enclosure. In these variations, the adapter may be positioned within the container enclosure before placement of the container within the adapter, such that the container is advanced into the container enclosure and then positioned within the adapter while the adapter is also within the container enclosure.

In some variations, the container enclosure may comprise a cavity that may be configured to receive the adapter and the container therein and positioning the container within the container enclosure may include positioning the adapter within the cavity of the container enclosure. A length of the adapter may be greater than, equal to, or less than the length of the cavity. Positioning the container within the container enclosure may include positioning the adapter such that a width of the adapter overlaps with at least a portion of a width of the cavity of the container enclosure as described herein.

Methods may further include positioning the adapter, and in some variations, a container enclosure containing the adapter, into a chamber (e.g., a chamber of a temperature control device). A housing of a temperature control device may enclose the chamber. The container enclosure may be positioned in the chamber such that the enclosed biological substance may be in thermal communication with a heating assembly that may be located within the housing of the temperature control device. For example, the heating assembly may include a thermal source and optionally a thermal conductor, as described in more detail herein. The thermal conductor and/or the adapter may function as a thermal interface between the thermal source and the biological substance.

The method (1800) further comprises activating the heating assembly to heat and thereby thaw the enclosed biological substance (1804). For example, activating the heating assembly may include activating the thermal source to generate thermal energy. The thermal energy may be transmitted to the biological substance via the adapter and the container. Activating the heating assembly may also include monitoring the temperature of the adapter and/or the temperature of the biological substance via one or more temperature sensors. In variations with two or more temperature sensors, the temperature of the adapter and/or the biological substance may be determined and/or controlled (e.g., by controlling/adjusting the temperature of a thermal source and/or a thermal conductor) based on an average of the temperature measurements from two or more (including all) of the temperature sensors, a change in temperature measurements from one or more (including all) of the temperature sensors, a rate of change in temperature measurement from one or more (including all) of the temperature sensors, a prediction of the rate of change of temperature for one or more (including all) of the temperature sensors, a maximum value of temperature measurement from one or more of (including all) the temperature sensors, a minimum value of temperature measurement from one or more of (including all) the temperature sensors, a combination thereof, and/or the like. In some variations, the method may further include removing the container from the temperature control device after the biological substance reaches an endpoint temperature as described herein. Removing the container may include removing the container from an adapter after the biological substance reaches the endpoint temperature. In some variations, removing the container may include removing the container and/or the adapter from a container enclosure after the biological substance reaches an endpoint temperature. In some variations, removing the container may include removing the container, the adapter, and/or the container enclosure from the chamber after the biological substance reaches an endpoint temperature.

EXAMPLES

Example 1—a Comparison of RNA Recovery from Plasma

In order to assess the impact of thawing frozen samples of plasma on RNA, samples of RNA were collected from a set of five patients. Each sample was divided into three portions of about 1.5 mL each for a total of fifteen samples. A first portion had RNA extracted from fresh plasma without freezing or thawing. A second portion had RNA extracted from −80° C. plasma after being thawed at room temperature. A third portion had RNA extracted from −80° C. plasma after being thawed using the devices (e.g., container enclosure) and methods described herein.

For each of the sample portions, a cDNA template was prepared from the extracted RNA. Given the instability of mRNA, it is standard in molecular testing to convert mRNA present in a sample to the more stable cDNA in order to quantify the mRNA. Degraded mRNA or an absence of mRNA corresponds to an absence of cDNA.

For each of the sample portions, real-time (e.g., quantitative) PCR was performed to quantify GAPDH mRNA levels. Real-time PCR was run in triplicate with a negative run and diluted plasma run as a control (no template) to account for noise. A Ct value corresponding to an amount of mRNA was determined for each sample portion.

A positive real-time PCR reaction is detected by accumulation of a fluorescent signal. The Ct (cycle threshold) is defined as the number of cycles required for the fluorescent signal to cross a predetermined threshold (i.e. exceed background level). Thus, lower Ct values corresponds to a higher concentration of template (in this case, GAPDH). The presence of a cDNA template corresponds to positive amplifications with a Ct value below 42. The absence of a detected cDNA template corresponds to negative amplifications with a Ct between 42 and 45. Samples diluted at a ratio of $1:10^5$ should yield no result. On a logarithmic curve, one Ct difference corresponds to double the amount of RNA.

The experimental design of Example 1 was stringent with a smaller volume (1.5 mL) being tested as compared to a volume of a vaccine (e.g., about 10 mL to about 20 mL). Thawing of the patient samples using the container enclosure was performed in less than about 5 minutes (e.g., about 3-4 minutes from −80° C.) while thawing the sample at room temperature was performed in about 1-2 hours.

Figure 15:
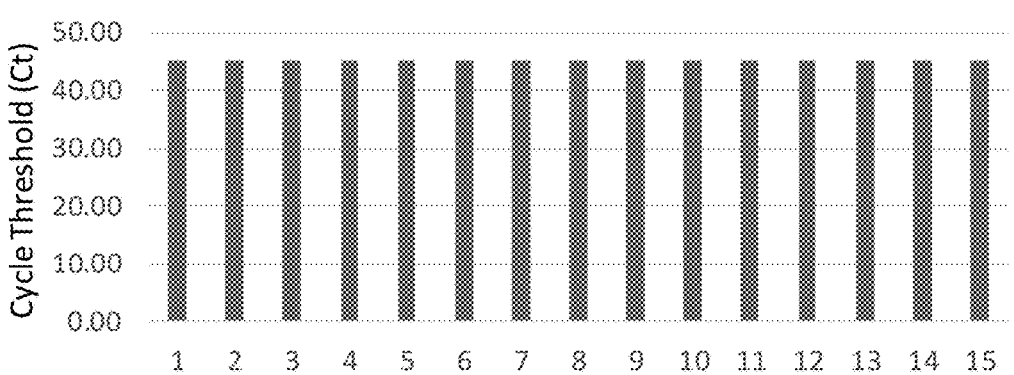
FIG. 15 is a plot of cycle threshold for a negative control set of patient samples.

FIG. 15 is a plot of cycle threshold for a negative control set of patient samples.

Figure 16:
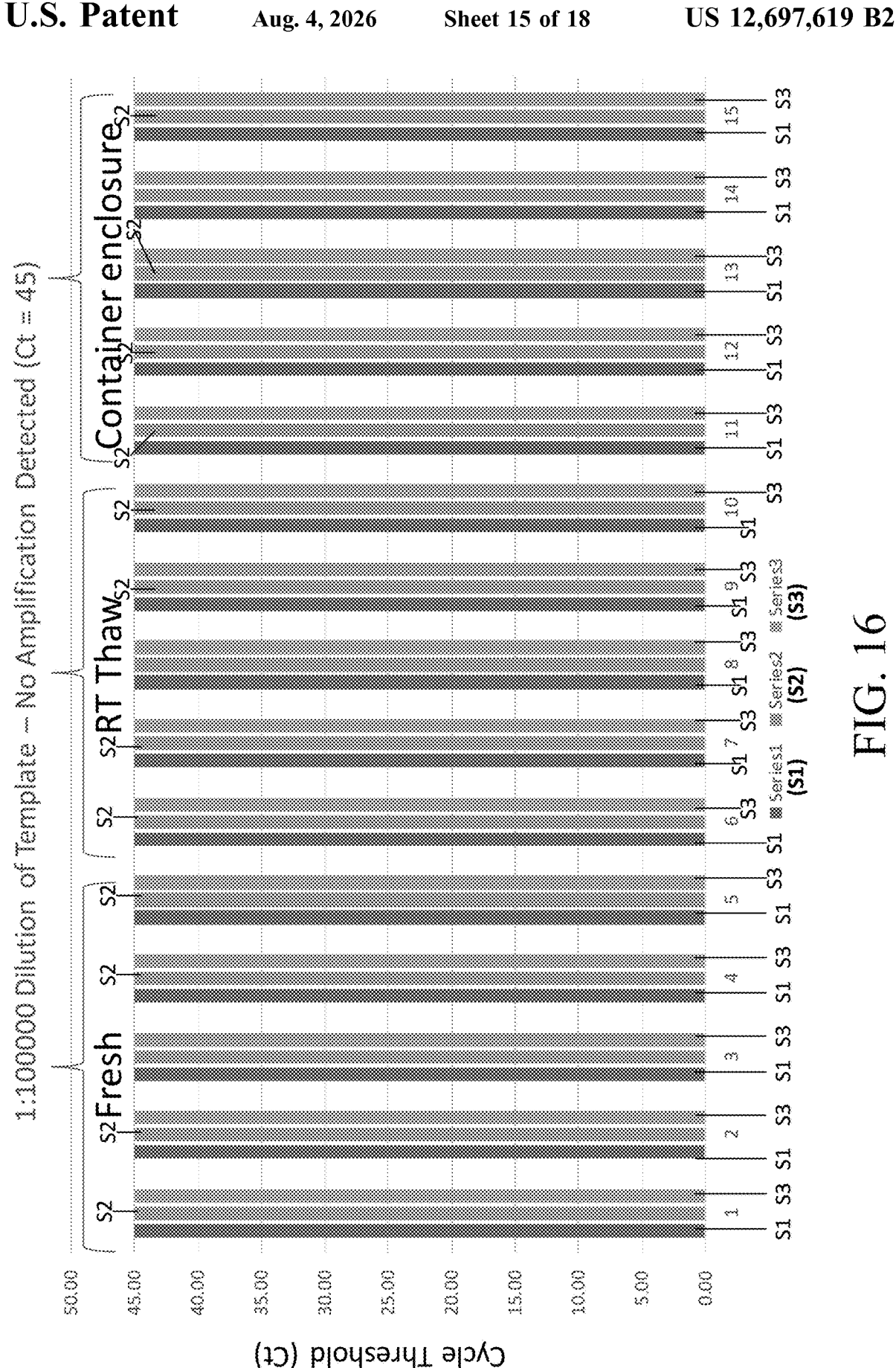
FIG. 16 is a plot of cycle threshold for a set of diluted patient blood samples.

FIG. 16 is a plot of cycle threshold for a set of diluted patient blood samples. No amplification was detected with a Ct of 45.

Figure 17A:
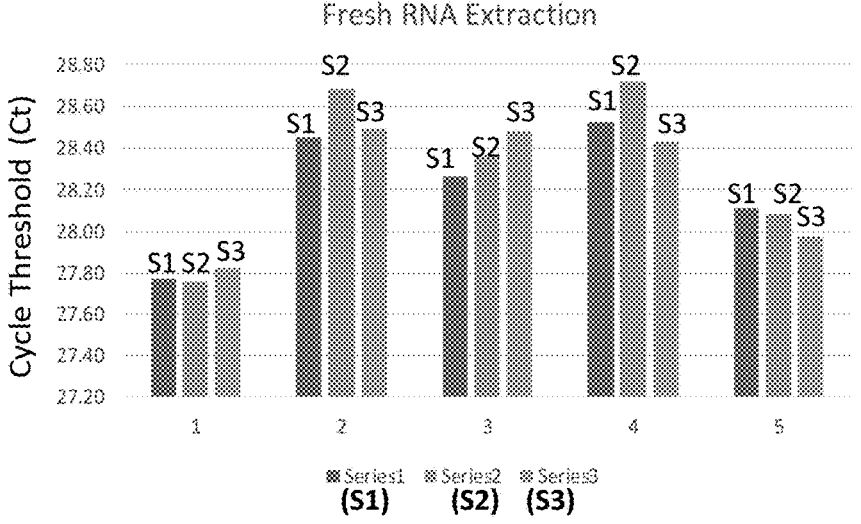
FIG. 17A is a plot of cycle threshold for RNA extracted from a set of fresh plasma samples.
Figure 17B:
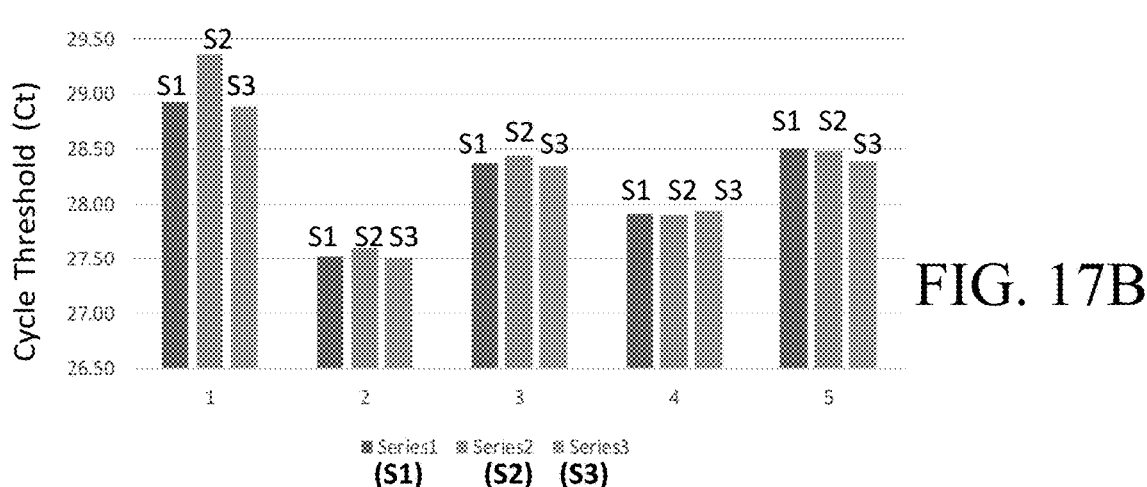
FIG. 17B is a plot of cycle threshold for RNA extracted from a set of plasma thawed from −80° C. plasma at room temperature.
Figure 17C:
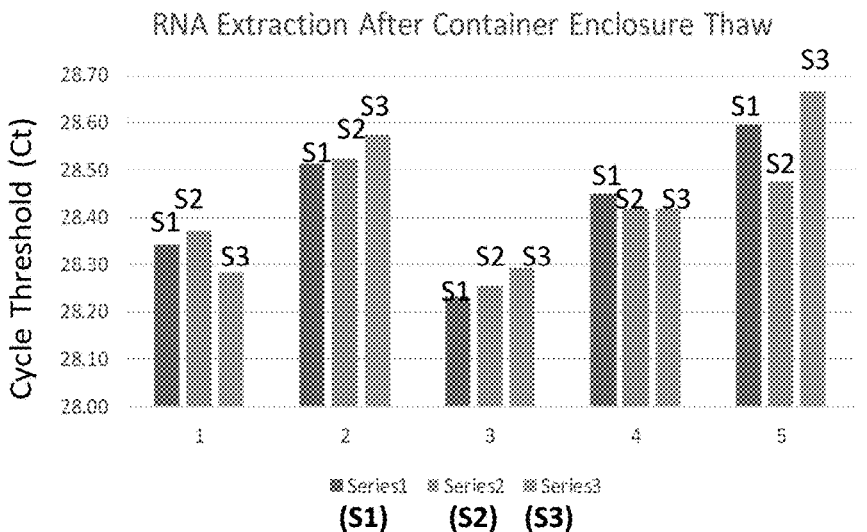
FIG. 17C is a plot of cycle threshold for RNA extracted from a set of plasma thawed from −80° C. plasma in a container enclosure.

FIG. 17A is a plot of cycle threshold for RNA extracted from a set of fresh plasma samples. FIG. 17B is a plot of cycle threshold for RNA extracted from a set of plasma thawed from −80° C. plasma at room temperature. FIG. 17C is a plot of cycle threshold for RNA extracted from a set of plasma thawed from −80° C. plasma in a container enclosure.

GAPDH mRNA was detected in all samples with Ct values below 45. Fresh mRNA samples yield Ct values between 27.7 and 28.7. Samples thawed at room temperature yield Ct values between 27.5 and 29.30. Samples thawed with a container enclosure and the devices and methods described herein yield Ct values between 28.2 and 28.65 (below 29.0). A ratio of Ct values between fresh mRNA and container enclosure thawed mRNA may be between about 0.9668:1 and about 1.0178:1.

The specific examples and descriptions herein are exemplary in nature and variations may be developed by those skilled in the art based on the material taught herein without departing from the scope of the present invention, which is limited only by the attached claims.

We claim:

1. A method of heating a biological substance using a thawing device, comprising:
    positioning a container comprising a biological substance in an adapter, wherein the biological substance is in a frozen state;
    inserting the adapter with the container into a container enclosure outside a thawing devicee, wherein the container enclosure is configured to be placed into and removed from a chamber of the thawing device and comprises a temperature sensor configured to measure a temperature and a guiding portion configured to guide the adapter to align a portion of the container to overlap the temperature sensor;
    positioning the adapter to align at least one portion of the container to overlap the temperature sensor, using the guiding portion;
    placing the container enclosure into the chamber of the thawing device;
    heating the enclosed biological substance to an endpoint temperature by controlling the thawing device based on the temperature measured by the temperature sensor overlapping the at least one portion of the container; and
    removing the container enclosure from the chamber of the thawing device after the biological substance has reached the endpoint temperature.

2. The method of claim 1, wherein heating the biological substance further comprises heating a thermal conductor positioned in the chamber.

3. The method of claim 1, wherein the biological substance comprises mRNA and the endpoint temperature is 4° C.

4. The method of claim 1, wherein the biological substance comprises blood plasma and the endpoint temperature is 15° C.

5. The method of claim 1, wherein positioning the adapter in the container enclosure includes positioning the adapter such that the adapter holds the container in alignment with the temperature sensor.

6. The method of claim 1, wherein the adapter holds the container in an upright position in the container enclosure.

7. The method of claim 1, wherein the adapter maintains the container in a position in which a longitudinal axis of the container is parallel to a longitudinal axis of the chamber when the container enclosure is positioned within the chamber.

* * * * *